US012667988B2

(12) United States Patent
Fuellgrabe et al.

(10) Patent No.: US 12,667,988 B2
(45) Date of Patent: Jun. 30, 2026

(54) HAIR REMOVAL APPARATUS

(71) Applicant: Braun GmbH, Kronberg (DE)

(72) Inventors: Martin Fuellgrabe, Bad Camberg (DE); Stefan Fuerst, Kronberg (DE); Christian Neyer, Eschborn (DE); Johannes Julian Weinkauff, Frankfurt am Main (DE); Lucy Abigail Zimmermann, Kronberg (DE)

(73) Assignee: Braun GMBH, Kronberg (DE)

(*) Notice: Subject to any disclaimer, the term of this patent is extended or adjusted under 35 U.S.C. 154(b) by 220 days.

(21) Appl. No.: 16/364,699

(22) Filed: Mar. 26, 2019

(65) Prior Publication Data

US 2019/0299435 A1 Oct. 3, 2019

(30) Foreign Application Priority Data

Mar. 27, 2018 (EP) .................................... 18164344

(51) Int. Cl.
*B26B 19/38* (2006.01)
*B26B 19/04* (2006.01)
*B26B 19/46* (2006.01)

(52) U.S. Cl.
CPC .......... *B26B 19/388* (2013.01); *B26B 19/048* (2013.01); *B26B 19/3886* (2013.01); *B26B 19/46* (2013.01)

(58) Field of Classification Search
CPC ... B26B 19/38; B26B 19/3873; B26B 19/388; B26B 19/3886; B26B 19/00; B26B 19/02; B26B 19/04; B26B 19/048; B26B 19/06; B26B 19/063; B26B 19/066
See application file for complete search history.

(56) References Cited

U.S. PATENT DOCUMENTS

| | | | | |
|---|---|---|---|---|
| 4,531,287 A * | 7/1985 | Shibata | .................. B26B 19/14 200/600 |
| 4,930,217 A | 6/1990 | Wolf et al. | |
| 5,007,168 A | 4/1991 | Messinger et al. | |
| 5,111,580 A | 5/1992 | Bosscha et al. | |
| 5,189,792 A | 3/1993 | Otsuka et al. | |

(Continued)

FOREIGN PATENT DOCUMENTS

| | | |
|---|---|---|
| CN | 1018016 B | 8/1992 |
| CN | 1688420 A | 10/2005 |

(Continued)

OTHER PUBLICATIONS

Chakravorty, How Machine Learning Works: An Overview, Oct. 2016, obtained from https://thenewstack.io/how-machine-learning-works-an-overview/, accessed Aug. 28, 2020 (Year: 2016).*

(Continued)

*Primary Examiner* — Evan H Macfarlane
(74) *Attorney, Agent, or Firm* — Gerd Zetterer

(57) ABSTRACT

A hair removal apparatus is provided including: a first sensor that is configured to determine a current handling of the hair removal apparatus during the hair removal operation, an actuator for changing a hair removal characteristic of the hair removal apparatus, a control unit for controlling the actuator, and an adaptation unit that is configured to adapt during the hair removal operation the control function of the control unit.

17 Claims, 7 Drawing Sheets

(56) References Cited

U.S. PATENT DOCUMENTS

| | | | |
|---|---|---|---|
| 5,257,456 | A | 11/1993 | Franke et al. |
| 5,687,481 | A | 11/1997 | De Boer et al. |
| 5,745,995 | A | 5/1998 | Yamashita et al. |
| 6,497,043 | B1 | 12/2002 | Jacobsen |
| 6,568,083 | B1 | 5/2003 | Taniguchi et al. |
| 6,826,835 | B1 | 12/2004 | Wong |
| 7,350,300 | B2 | 4/2008 | Yamaguchi et al. |
| 7,364,052 | B2 | 4/2008 | Spatafora |
| 7,832,104 | B2 | 11/2010 | Yamasaki et al. |
| 7,976,388 | B2 | 7/2011 | Park et al. |
| 8,533,960 | B1 | 9/2013 | Barish |
| 8,585,411 | B2 | 11/2013 | Puurunen et al. |
| 8,667,692 | B2 | 3/2014 | Kraus |
| 8,938,885 | B2 | 1/2015 | Stevens |
| 9,750,586 | B2 | 9/2017 | Hwang et al. |
| 10,179,418 | B2 | 1/2019 | Hendriks et al. |
| 10,576,647 | B2 | 3/2020 | Uit De Bulten et al. |
| 2001/0025421 | A1 | 10/2001 | Damstra |
| 2002/0088121 | A1* | 7/2002 | Jacobsen ............. B26B 21/4056 30/34.05 |
| 2004/0098862 | A1 | 5/2004 | Orloff |
| 2004/0231160 | A1 | 11/2004 | Shiba et al. |
| 2005/0216035 | A1 | 9/2005 | Kraus et al. |
| 2007/0124936 | A1 | 6/2007 | Okabe |
| 2007/0192174 | A1 | 8/2007 | Bischoff |
| 2007/0277379 | A1 | 12/2007 | Okabe |
| 2008/0034591 | A1 | 2/2008 | Fung |
| 2008/0196258 | A1 | 8/2008 | Kraus |
| 2009/0000126 | A1 | 1/2009 | Kraus |
| 2009/0056141 | A1 | 3/2009 | Barry et al. |
| 2009/0119923 | A1 | 5/2009 | Hart et al. |
| 2009/0133263 | A1* | 5/2009 | Eichhorn .............. B26B 19/048 30/346.51 |
| 2010/0170052 | A1 | 7/2010 | Ortins et al. |
| 2010/0186234 | A1 | 7/2010 | Binder |
| 2011/0094102 | A1 | 4/2011 | Guan et al. |
| 2011/0094107 | A1 | 4/2011 | Ring et al. |
| 2011/0131812 | A1* | 6/2011 | Erndt .................... B26B 19/063 30/34.1 |
| 2011/0197726 | A1 | 8/2011 | Kraus |
| 2011/0203364 | A1 | 8/2011 | Staake et al. |
| 2013/0025078 | A1 | 1/2013 | Heil et al. |
| 2013/0097873 | A1 | 4/2013 | Luo et al. |
| 2014/0207811 | A1 | 7/2014 | Kim et al. |
| 2015/0020658 | A1 | 1/2015 | Eljaouhari |
| 2015/0032128 | A1 | 1/2015 | Tavlin et al. |
| 2015/0197016 | A1 | 7/2015 | Krenik |
| 2016/0001455 | A1 | 1/2016 | Swenson |
| 2016/0143718 | A1 | 5/2016 | Serval |
| 2016/0167241 | A1 | 6/2016 | Goldfarb et al. |
| 2016/0199987 | A1 | 7/2016 | Brada et al. |
| 2016/0263755 | A1 | 9/2016 | Uit De Bulten et al. |
| 2017/0043490 | A1 | 2/2017 | Uit De Bulten |
| 2017/0097758 | A1 | 4/2017 | Bauer et al. |
| 2017/0099199 | A1 | 4/2017 | Bauer et al. |
| 2017/0172278 | A1 | 6/2017 | Mehaddene et al. |
| 2017/0232624 | A1 | 8/2017 | King |
| 2017/0272842 | A1 | 9/2017 | Touma et al. |
| 2017/0291319 | A1* | 10/2017 | Hendriks .............. B26B 21/222 |
| 2017/0325566 | A1* | 11/2017 | Franklin ............... B26B 19/388 |
| 2017/0340085 | A1 | 11/2017 | Kindermann |
| 2018/0000219 | A1 | 1/2018 | Roenneberg et al. |
| 2018/0236675 | A1 | 8/2018 | Westerhof et al. |
| 2018/0243929 | A1 | 8/2018 | Takechi et al. |
| 2018/0293511 | A1* | 10/2018 | Bouillet ................. G06N 5/022 |
| 2019/0015998 | A1 | 1/2019 | Neyer et al. |
| 2019/0061183 | A1 | 2/2019 | Neyer et al. |
| 2019/0090999 | A1 | 3/2019 | Vetter et al. |
| 2019/0126500 | A1 | 5/2019 | Wu |
| 2019/0224869 | A1* | 7/2019 | Robinson .............. B26B 21/227 |
| 2019/0227528 | A1 | 7/2019 | Abbott et al. |
| 2019/0299432 | A1 | 10/2019 | Fuerst et al. |
| 2019/0299434 | A1 | 10/2019 | Fuerst et al. |
| 2019/0299436 | A1 | 10/2019 | Fuellgrabe et al. |
| 2019/0299437 | A1 | 10/2019 | Fuellgrabe et al. |
| 2019/0306259 | A1 | 10/2019 | Burghardt et al. |
| 2020/0156272 | A1* | 5/2020 | De Vries ............... B26B 19/145 |
| 2020/0316799 | A1 | 10/2020 | Tsegenidis et al. |

FOREIGN PATENT DOCUMENTS

| | | | | |
|---|---|---|---|---|
| CN | 101621400 | A | 1/2010 | |
| CN | 202106393 | U | 1/2012 | |
| CN | 203197960 | U | 9/2013 | |
| CN | 104185537 | A | 12/2014 | |
| CN | 204431302 | U | 7/2015 | |
| CN | 105835093 | A | 8/2016 | |
| CN | 105899336 | A | 8/2016 | |
| CN | 106407935 | A | 2/2017 | |
| CN | 106621280 | A | 5/2017 | |
| CN | 106778618 | A | 5/2017 | |
| CN | 107073727 | A | 8/2017 | |
| CN | 107107351 | A | 8/2017 | |
| CN | 107243905 | A | 10/2017 | |
| CN | 107414902 | A | 12/2017 | |
| CN | 107627329 | A | 1/2018 | |
| CN | 107682178 | A | 2/2018 | |
| CN | 107718059 | A | 2/2018 | |
| CN | 110303526 | A | 10/2019 | |
| CN | 110303531 | A | 10/2019 | |
| CN | 110303532 | A | 10/2019 | |
| CN | 110303533 | A | 10/2019 | |
| DE | 10246519 | A1 | 4/2004 | |
| DE | 102005045713 | A1 | 3/2007 | |
| DE | 102006004675 | A1 | 8/2007 | |
| DE | 102008031132 | A3 | 5/2010 | |
| DE | 102014001163 | A1 | 8/2015 | |
| DE | 102010023681 | B4 | 2/2016 | |
| EP | 720523 | B1 | 8/1998 | |
| EP | 1165294 | B1 | 6/2003 | |
| EP | 1854593 | B1 | 11/2007 | |
| EP | 1549468 | B1 | 11/2011 | |
| EP | 3197649 | B1 | 5/2018 | |
| EP | 3513924 | A1 | 7/2019 | |
| EP | 3513925 | A1 | 7/2019 | |
| EP | 3546150 | A1 | 10/2019 | |
| EP | 3546151 | A1 | 10/2019 | |
| EP | 3546152 | A1 | 10/2019 | |
| EP | 3546153 | A1 | 10/2019 | |
| JP | S5737472 | A | 3/1982 | |
| JP | S58-077445 | U | 5/1983 | |
| JP | S5877445 | A | 5/1983 | |
| JP | 59184778 | U | 12/1984 | |
| JP | 04195302 | A | 7/1992 | |
| JP | H06-086873 | A | 3/1994 | |
| JP | H6335575 | A | 12/1994 | |
| JP | 08152902 | A | 6/1996 | |
| JP | H8-152902 | | 6/1996 | |
| JP | H08187376 | A | 7/1996 | |
| JP | H9-101804 | | 4/1997 | |
| JP | 2000507139 | A | 6/2000 | |
| JP | 2000508570 | A | 7/2000 | |
| JP | 2003-009937 | A | 1/2003 | |
| JP | 2004130153 | A | 4/2004 | |
| JP | 2006-501911 | A | 1/2006 | |
| JP | 2006255335 | A | 9/2006 | |
| JP | 2008501911 | A | 1/2008 | |
| JP | 2008043426 | A | 2/2008 | |
| JP | 2008307132 | A | 12/2008 | |
| JP | 2009-508606 | A | 3/2009 | |
| JP | 2009-525090 | A | 7/2009 | |
| JP | 2010-227224 | * | 10/2010 | ............ B26B 19/04 |
| JP | 2010227223 | A | 10/2010 | |
| JP | 2010227224 | A | 10/2010 | |
| JP | 2011526168 | A | 10/2011 | |
| JP | 2012527939 | A | 11/2012 | |
| JP | 2016077464 | A | 5/2016 | |
| JP | 2016514557 | A | 5/2016 | |
| JP | 2016534805 | A | 11/2016 | |
| JP | 2017526492 | A | 9/2017 | |
| JP | 2017-529168 | A | 10/2017 | |
| JP | 2017536948 | A | 12/2017 | |
| JP | 2018503420 | A | 2/2018 | |
| JP | 2018-532481 | A | 11/2018 | |

(56) References Cited

FOREIGN PATENT DOCUMENTS

| | | | |
|---|---|---|---|
| JP | 2019171033 | A | 10/2019 |
| JP | 2019171049 | A | 10/2019 |
| JP | 2019171051 | A | 10/2019 |
| JP | 2019171060 | A | 10/2019 |
| WO | 2001013757 | A1 | 3/2001 |
| WO | 02083257 | A2 | 10/2002 |
| WO | 2007033729 | A1 | 3/2007 |
| WO | 2014091719 | A1 | 6/2014 |
| WO | 2015067489 | A1 | 5/2015 |
| WO | 2015067498 | A1 | 5/2015 |
| WO | 2016094327 | A1 | 6/2016 |
| WO | 2016096581 | A1 | 6/2016 |
| WO | 2016180929 | A1 | 11/2016 |
| WO | 2017032547 | A1 | 3/2017 |
| WO | 2017062326 | A1 | 4/2017 |
| WO | 2017157411 | A1 | 9/2017 |
| WO | 2018002755 | A1 | 1/2018 |
| WO | 2018037318 | A1 | 3/2018 |

OTHER PUBLICATIONS

Boukhalfa, IoT and AI Combine to Dominate Consumer Electronics, May 2017, obtained from https://www.prescouter.com/2017/05/iot-ai-consumer-electronics/, accessed Aug. 28, 2020 (Year: 2017).*
Smuts, Tutorial on Filters in Control Systems, Nov. 2016, obtained from https://blog.opticontrols.com/archives/1319, accessed Aug. 28, 2020 (Year: 2016).*
Bermudez-Chacon et al., Automatic problem-specific . . . , 2015, obtained from https://www.research-collection.ethz.ch/bitstream/handle/20.500.11850/107673/eth-48308-01.pdf, accessed Aug. 30, 2020 (Year: 2015).*
Lewis et al., Reinforcement Learning and Optimal Adaptive Control, Oct. 2011, Chapter 11, pp. 461-517 (Year: 2011).*
European search report dated Dec. 14, 2018.
European Opinion and Search Report; EP Application No. 18164341; Jul. 11, 2018; European Patent Office; Munich, Germany.
European Opinion and Search Report; EP Application No. 18164343; Jul. 9, 2018; European Patent Office; Munich, Germany.
European Opinion and Search Report; EP Application No. 18164369; Jul. 16, 2018; European Patent Office; Munich, Germany.
Japan Search Report; Japan Application No. 2019044483; Apr. 23, 2020; Japan Patent Office; Tokyo, Japan.
Notice of Refusal; Japan Application No. 2019044483; Jun. 2, 2020; Japan Patent Office; Tokyo, Japan.
Notice of Refusal; Japan Application No. 2019056991; Apr. 28, 2020; Japan Patent Office; Tokyo, Japan.
Patel, Bharat C.; Restriction/Election Requirement; U.S. Appl. No. 16/364,739; May 27, 2020; U.S. Patent and Trademark Office; Alexandria, Virginia.
Davies, Samuel Allen; Restriction/Election Requirement; U.S. Appl. No. 16/364,713; Jun. 19, 2020; U.S. Patent and Trademark Office; Alexandria, Virginia.
Search Report; Chinese Application No. 2019102349467; Aug. 26, 2020; Chinese National Intellectual Property Administration; Beijing, China.
Search Report by registered search authority Techno Search, Inc.; Japan Application No. 2019-052818; Jun. 17, 2020; Japanese Patent Office; Tokyo, Japan.
Search Report; Chinese Application No. 2019102349433; Aug. 17, 2020; Chinese National Intellectual Property Administration; Beijing, China.
Search Report; Chinese Application No. 2019102249740; Aug. 31, 2020; Chinese National Intellectual Property Administration; Beijing, China.
Search Report by registered search authority Techno Search, Inc.; Japan Application No. 2019-053167; Jun. 16, 2020; Japanese Patent Office; Tokyo, Japan.
Search Report; Chinese Application No. 2019102309169; Jun. 20, 2020; Chinese National Intellectual Property Administration; Beijing, China.
All Office Actions, U.S. Appl. No. 16/364,739.
All Office Actions, U.S. Appl. No. 16/364,753.
All Office Actions, U.S. Appl. No. 16/364,682.
All Office Actions,U.S. Appl. No. 16/364,713.
All Office Actions, U.S. Appl. No. 16/364,731.
Nunziante Calabrese; Extended European Search Report; European Patent Application No. 18164337.0; Jul. 18, 2018; EPO; Munich, Germany.
Nunziante Calabrese; Extended European Search Report; European Patent Application No. 18164335.4; Jul. 18, 2018; EPO; Munich, Germany.
Japanese Search by Registered Search Authority Industrial Property Cooperation Center; Japanese Patent Application No. 2019-052815; Jul. 17, 2020; Japanese Patent Office; Tokyo, Japan.
Japanese Search by Registered Search Authority AIRI; Japanese Patent Application No. 2019-047272; Apr. 16, 2020; Japanese Patent Office; Tokyo, Japan.
Chinese Search Report; Chinese Application No. 2019102349429; Aug. 8, 2020; CNIPA; Beijing, China.
Chinese Search Report; Chinese Application No. 2019102297388; Jun. 18, 2020; CNIPA; Beijing, China.

* cited by examiner

HAIR REMOVAL APPARATUS

FIELD OF THE INVENTION

Embodiments of the present invention relate to a hair removal apparatus for removing, in a hair removal operation, hair from a body portion, to a shaver comprising an adjustable shaver head, a method for controlling a hair removal apparatus for removing, in a hair removal operation, hair from a body portion, and a computer readable digital storage medium having stored thereon, a computer program having a program code for performing, when running on a computer, said method. In particular, a behavior driven response system for a hair removal apparatus is described.

BACKGROUND OF THE INVENTION

The invention is concerned with hair removal, also including hair shortening. A hair removal apparatus may for instance comprise a shaver, a razor that may be used as a dry or a wet razor and that may optionally be electrically driven, a groomer, an epilator, an optical epilation device and the like.

Common hair removal apparatuses use single or fixed designs following the motto one size fits all. With such a single or fixed design it is not possible to deliver an optimal hair removal result and/or experience for all men due to many widely varying factors. For example, different men may have different shaving behaviors, different desired results or different needs. These and other factors vary between different users and can even vary for the same user during different moments in the shave.

There have been attempts in the past for addressing these daily life problems. For example, WO 2015/067 498 A1 describes a system for hair cutting. This system uses a camera for imaging a person that cuts its hair with a hair cutting machine and to identify the position of the hair cutting machine. Depending on the position of the hair cutting machine relative to the person's head, a distance of the cutting unit can be changed. Prior to starting a hair cutting operation, the user has to select a position reference profile and the system strictly uses this selected reference profile for changing the distance of the cutting unit. The user may create an individual position reference profile. However, after creating this individual position reference profile, it is then stored for later use. Accordingly, prior to starting a new hair cutting operation the user has to select this individual position reference profile and the system strictly uses this reference profile for changing the distance of the cutting unit.

This known system always needs a position information to work properly, i.e. an adjustment may only be executed if the position of the hand-held treating device is known. Furthermore, the system relies on fixed reference profiles which have to be selected prior to starting a hair cutting operation. During a hair cutting operation, the system strictly uses the fixed reference profile for changing the distance of the cutting unit.

Thus, there is a need for improving existing hair removal apparatuses regarding the above mentioned drawbacks.

SUMMARY OF THE INVENTION

A first aspect of the invention concerns a hair removal apparatus for removing, in a hair removal operation, hair from a body portion. The hair removal apparatus may comprise, inter alia, a first sensor that is configured to determine a current handling of the hair removal apparatus during the hair removal operation. The apparatus may further comprise an actuator for changing a hair removal characteristic of said hair removal apparatus. The apparatus may further comprise a control unit for controlling the actuator, wherein the control unit is configured to receive first input data from the first sensor and to map, by using a control function, said received first input data to an output signal for controlling the actuator during the hair removal operation. The apparatus may further comprise an adaptation unit that is configured to receive second input data from the first sensor and/or from a second sensor. According to this inventive aspect, the adaptation unit is configured to adapt the control function of the control unit depending on the received second input data during execution of the hair removal operation.

A second aspect of the invention concerns a shaver that may, inter alia, comprise a pressure sensor that is configured for sensing a current pressure exerted by the shaver on a user's skin during a shaving operation. The shaver may further comprise a shaver body and a shaver head being pivotally attached to said shaver body, wherein the shaver head is configured to move relative to the shaver body by swiveling around a pivoting axis. The shaver may further comprise a retention force mechanism being attached to the shaver body and the shaver head, wherein a swiveling force for swiveling the shaver head depends on a retention force provided by the retention force mechanism. The shaver may further comprise an actuator for altering the retention force of the retention force mechanism for changing a hair removal characteristic of the shaver. The shaver may further comprise a control unit for controlling the actuator, wherein the control unit is configured to receive pressure sensor data from the pressure sensor and to map, by using a control function, said received pressure sensor data to an output signal for controlling the actuator during the shaving operation. The shaver may further comprise an adaptation unit that is configured to receive the pressure sensor data from the first sensor and/or further sensor data from a second sensor. According to this inventive aspect, the adaptation unit is configured to adapt the control function of the control unit depending on the received sensor data during execution of the shaving operation.

A third aspect of the invention concerns a method for controlling a hair removal apparatus for removing hair from a body portion in a hair removal operation. The method may, inter alia, comprise a step of receiving from a first sensor first input data based on a sensing of a current handling of the hair removal apparatus during the hair removal operation. The method may further comprise a step of controlling an actuator for changing a hair removal characteristic of the hair removal apparatus, wherein the step of controlling comprises receiving the first input data and to map, by using a control function, said received first input data to an output signal for controlling the actuator during the hair removal operation. The method may further comprise a step of receiving second input data from the first sensor and/or from a second sensor. According to this inventive aspect, the method comprises a step of adapting the control function of the control unit depending on the received second input data during execution of the hair removal operation.

A fourth aspect of the invention concerns a computer readable digital storage medium having stored thereon, a computer program having a program code for performing, when running on a computer, the above mentioned method.

BRIEF DESCRIPTION OF THE DRAWINGS

In the following, embodiments of the present invention are described in more detail with reference to the figures, in which.

DETAILED DESCRIPTION OF THE INVENTION

Figure 1:
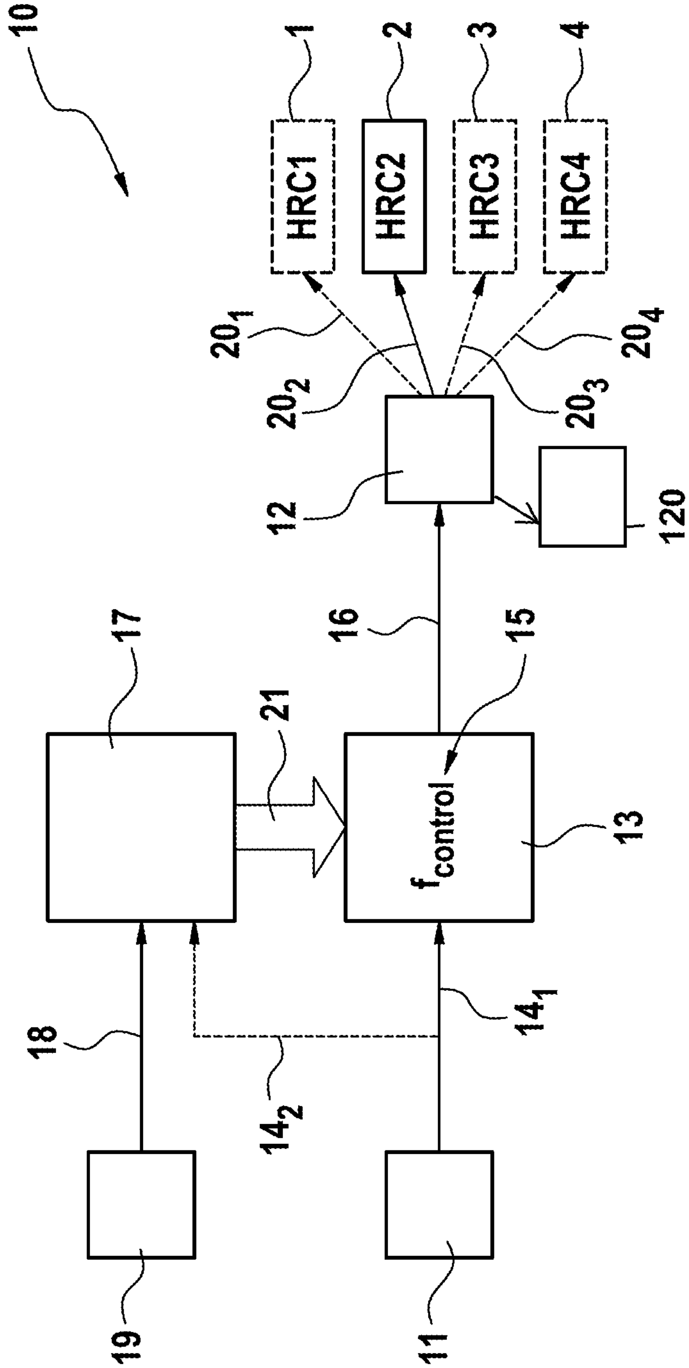
FIG. 1 shows a schematic block diagram of a hair removing apparatus according to an embodiment.

Equal or equivalent elements or elements with equal or equivalent functionality are denoted in the following description by equal or equivalent reference numerals.

Furthermore, the dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Although some aspects will be described in the context of an apparatus or device, it is clear that these aspects also represent a description of the corresponding method, where a block or device corresponds to a method step or a feature of a method step. Analogously, aspects described in the context of a method or method step also represent a description of a corresponding block or item or feature of a corresponding apparatus or device.

The following examples are described with reference to a hair removal apparatus, wherein hair removal may also include hair shortening. A hair removal apparatus may for instance comprise a shaver, a razor that may be used as a dry or a wet razor and that may optionally be electrically driven, a groomer, an epilator, an optical epilation device and the like.

For simplicity, the following description may refer to a shaver as a non-limiting example for a hair removal apparatus. This should however not be understood to exclude the other devices mentioned above. A hair removal apparatus should also be understood as a hair removal system that may comprise a hair removal device, such as a shaver or the like, and optionally additional devices. Accordingly, a "shaver" should also be understood to mean a "shaver system", e.g. a shaver and additional devices. Additional devices could be dedicated devices, such as a cleaning center, or non-dedicated devices, such as a smart phone.

As initially mentioned, there is a desire to have an adjustable hair removal apparatus, for example a hair removing apparatus that is adjustable to different situations. However, if the adjustment needs to be made by the user, then this may have multiple disadvantages. Firstly, this may be inconvenient, which results in the adjustment often not being used. Secondly, it may very often not be clear to the user what adjustment is needed to best achieve what he is trying to achieve. A typical example can be illustrated by a common problem: individual missed hairs that are often left uncut during the standard shaving routine. The user then tries in different ways after the rest of the shave to shave these individual hairs. A typical behavior is repeated short strokes over the area with increasing pressure on the cutting elements, whereas research shows that decreasing, not increasing, the pressure is beneficial for this situation.

Alternatively, the adjustment can be automatic. However existing devices that attempt this, do not deliver an optimal result. Two typical reasons have emerged for the poor performance:

First, the adjustment is pre-determined, which may not work for all men. For example, the level of shave pressure that leads to skin irritation varies between men and can vary for the same man between days. A shaver that reacts in a pre-determined way to a certain level of shave pressure in order to avoid skin irritation will react too early for some men and too late for others.

Second, the design may not take the high complexity of a shave sufficiently into account. For example, the quality of the overall shave result and experience depends on the summation of many different interacting shaving parameters, e.g. closeness, skin comfort, time of shave, gliding, skin experience, feeling of control, accuracy of beard contours, etc. These shaving parameters are in turn influenced/determined by the combination of multiple behavioral, physiological, climatic and other parameters, which again have their own complex interactions.

The hair removal apparatuses subsequently described address these problems by providing an automatic real time adjustment of one or more functional properties of the hair removal apparatus based on shaving behavior parameters, which will be described in more detail in the following with reference to the Figures.

FIG. 1 shows a schematic block diagram of an example of a hair removal apparatus 10. The hair removal apparatus 10 is for removing, in a hair removal operation, hair from a body portion.

The hair removal apparatus 10 may comprise a first sensor 11 that is configured to determine a current handling of the hair removal apparatus 10 during the hair removal operation. Different users may handle the hair removal apparatus 10 in a different manner during execution of the hair removing operation, i.e. different users may have different styles of handling the hair removal apparatus 10 during execution of the hair removing operation. For example, a first user may move the hair removal apparatus 10 slower than a second user during execution of the hair removing operation, or a first user may push the hair removal apparatus 10 harder on its body than a second user during execution of the hair removing operation. In more general terms, the handling of the hair removal apparatus may define the way how the hair removal apparatus is currently used in order to remove/shorten hairs. Examples of sensors that may be configured to determine a current handling of the hair removal apparatus 10 during execution of the hair removing operation will be given later in the text.

The hair removal apparatus 10 may comprise an actuator 12 for changing a hair removal characteristic. The actuator 12 may be a dedicated hardware actuator, examples of which will be given below. The actuator 12 may, in some examples, also be implemented in software. The actuator 12 may change the hair removal characteristic of the hair removal apparatus 10 by acting on one or more relevant pieces of the hair removal apparatus 10, which one or more pieces may comprise different adjustments that may have different effects on the hair removal characteristic during the hair removal operation. Upon acting on said one or more pieces, the actuator 12 may change an adjustment of said one or more pieces. For instance, the actuator 12 may change a distance between a razor blade and the skin of a user which may lead to the effect of different hair lengths during a hair cutting operation.

FIG. 1 illustrates the hair removal characteristic as assuming one of discrete states 1, 2, 3, 4 between which the actuator 12 may change, but as the following description will reveal this is merely an example and any number of states between which the actuator 12 may change the hair removal apparatus' hair removal characteristic greater than one or even a continuous variation of the hair removal characteristic may be achieved by the actuator 12 as well. The actuator 12 may be coupled to the hair removal apparatus 10, e.g. mounted in, at or on the hair removal apparatus 10. As will be outlined in more detail below, the actuator 12 may be e.g. one changing a preload of a spring exerting a retention force onto a moveably mounted member of the hair removal apparatus 10 such as a shear head. Instead of changing the retention force mechanically, the actuator 12 may change and exert the retention force electrostatically and/or magnetically, i.e. the retention force may be generated by electrostatic and/or magnetic force acting on the moveably mounted member and the retention force may be amended by amending the strength of the electrostatic and/or magnetic force. The hair removal characteristic may, accordingly, define the hair removal apparatus 10 in terms of quality of haircut, the softness of the shave or the like, or speaking in more concrete terms, in terms of rigidity of the moveable shear head mount, or the like.

As a further non-limiting example, the actuator 12 may be a servo motor that may drive an adjustment mechanism of the hair removal apparatus 10 for adjusting a distance between two reciprocally moving cutting blades 120. In a first mode the actuator 12 may adjust a first distance between the blades which effects a first hair removal characteristic 1, for example a first hair cutting length. In a second mode the actuator 12 may adjust a second distance between the blades which effects a second hair removal characteristic 2, for example a second hair cutting length.

Summarizing, the actuator 12 may act on a dedicated physical functional element, such as a mechanic, which may itself be a piece of hardware, in order to provide the physical function of altering a hair removal characteristic. In other words, the actuator 12 may adjust a device functional property of the hair removal apparatus in order to achieve a certain hair removal characteristic. Thus, an adjustment of the physical functional element by means of the actuator 12 may provide an adjustment of a certain device functional property which, in turn, leads to a certain hair removing characteristic.

Device functional properties means for example for a shaver that the property may be directly relevant to shaving, as opposed to for example adjusting the color of the shaver or releasing a scent—these things not being directly related to shaving.

The following non-exhaustive list may provide some non-limiting examples of device functional properties that may be adjusted in order to achieve a certain hair removing characteristic:

- height of different cutting elements and/or non-cutting elements (e.g. guard, combs, etc.) relative to each other
- blade frequency
- blade amplitude
- floating force of individual cutting elements
- force needed to swivel/tilt head
- ratio between area of cutting parts to area of non-cutting parts (e.g. head frame) in contact with users skin
- skin tensioning elements
- 3D angle of head relative to body
- height of head relative to body
- foil hole size/pattern
- shaver head vibrations
- handle vibrations
- sound of motor Following may instead not be considered to be (physical) functional properties:

- whether the shaver is on/off
- application of chemistries, fluids, etc., even if coming from a shaver
- signals/feedback
- data collection parameters etc.—this is not a physical change
- change to feedback settings etc.—this is not a physical change Still referring to FIG. 1, the hair removal apparatus 10 may further comprise a control unit 13. The control unit 13 is configured to control the actuator 12. To do so, the control unit 13 may be configured to receive first input data 14$_1$ from the first sensor 11. As mentioned above, the first sensor 11 may provide sensor data related with a current handling of the hair removal apparatus 10 during execution of the hair removing operation. Accordingly, said first input data 14$_1$ may comprise information representing the current handling of the hair removal apparatus 10.

Furthermore, the control unit 13 may be configured to map said received first input data 14$_1$ to an output signal 16 for controlling the actuator 12 during the hair removal operation. The control unit 13 is configured to use a control function 15 ($f_{control}$) for mapping the received first input data 14$_1$ to the output signal 16 for the actuator 12. That is, the control unit 13 is configured to determine an output signal 16 on the basis of the first input data 14$_1$ and, to this end, is characterized in that the output signal 16 depends on the first input data 14$_1$ according to control function 15 ($f_{control}$).

The hair removal apparatus 10 may further comprise an adaptation unit 17. The adaptation unit 17 may be configured to receive second input data 14$_2$, 18. The adaptation unit 17 may receive said second input data from a second sensor 19, as indicated by the transition 18. Additionally or alternatively, the adaptation unit 17 may receive said second input data from the first sensor 11, as indicated by the transition 14$_2$ in dashed lines.

The second input data 14$_2$ may comprise the same sensor data and/or information than the first input data 14$_1$ fed into the control unit 13. In this case the second input data 14$_2$ being fed into the adaptation unit 17 corresponds to the first input data 14$_1$ being fed into the control unit 13. Alternatively, the second input data 14$_2$ may comprise different sensor data and/or information than the first input data 14$_1$ being fed into the control unit 13.

Depending on the received second input data 14$_2$, 18, the adaptation unit 17 may be configured to adapt during the hair removal operation the control function 15 of the control unit 13, as it is indicated by arrow 21. Accordingly, the control unit 13 may be configured to receive an input 21 from the adaptation unit 17. In response to said input 21 the control unit 13 may adapt its control function 15 to the current situation, i.e. adapt the control function 15 to the determined current handling of the hair removal apparatus 10.

Adapting may comprise modifying the control function 15. For example, the control function 15 may be modified so as to differently process the first input data $\mathbf{14}_1$, for example by using different input information, to use different parameters for processing the first input data $\mathbf{14}_1$, or the like. Additionally or alternatively, adapting may comprise changing the control function 15. For example, the control unit 13 may change from a first control function 15 to a second control function for processing the first input data $\mathbf{14}_1$. In other words, adaptation may be performed by switching from one preconfigured control function to another or changing a parametrization of the control function 15, for example, with this being done dependent on a real time evaluation of the second input data $\mathbf{14}_2$, 18. The evaluation may, as described in more detail below, involve an averaging of a predetermined most recent history of a signal being equal to the second input data $\mathbf{14}_2$, 18 or derived therefrom by combination, and a comparison or differentiating combination, such as by forming a subtraction or division, of the average on the one hand and a current version of signal on the other hand, so as to enable to determine based on the comparison or the combination the entrance, for instance, of certain non-normal situations during a shave where changing the control function might improve the shave procedure. As described below, a neural network and/or machine learning classifier may be used as well, thereby identifying the entrance of such situations on the basis of applying the neural network onto the second input data $\mathbf{14}_2$, 18. Each "situation" may be associated with a corresponding preconfigured control function to which the control unit 13 is switched accordingly. Alternatively, parameters of the control function may be adapted to adapt the control function to the situation, gradually or discontinually.

This adaptation of the control function 15 happens during operation, i.e. during execution of the hair removal operation. Thus, the control function 15 may be adapted by the adaptation unit 17 in real time, i.e. dynamically during execution of the hair removal operation. The prior art may only pre-select a fixed operating scheme prior to the execution of the hair removal operation. Once the fixed operating scheme is selected, it is not adapted any further in real time, i.e. it is not adapted during execution of the hair removal operation.

It is the adaptation unit 17 that provides for the possibility of performing a real time adaptation of the control function 15 of the control unit 13. Thus, the concept is also different from a common feedback control loop which only works upon receiving direct feedback from an actuator. The concept may work without getting feedback from the actuator.

The actuator 12 of the present disclosure may be active during the adaptation of the control function 15. In other words, the actuator 12 may be controlled by the control unit 13 during the hair removal operation. Accordingly, since the actuator 12 may change a hair removal characteristic, said hair removal characteristic may be changed during the normal operation, i.e. during the hair removal operation. Thus, there may be no need for a special calibration mode, a setup mode or the like. The hair removal characteristic may be changed one or several times during the regular hair removal operation, i.e. the actuator 12 may be controlled by the control unit 13 one or several times during the hair removal operation. The control unit 13 may control the actuator 12 continually or discontinually during the hair removal operation. Controlling the actuator 12 during the hair removal operation may depend on the control function 15 that is currently used by the control function 13 and which may be adapted by the adaptation unit 17. The adaptation of the control function 15 may be performed automatically by the adaptation unit 17. In common systems, a user has to trigger or initiate any functional changes, wherein the user may directly act on the actuator or on the control unit, e.g. by pressing a button. Here, it is the adaptation unit 17 that provides for the possibility of performing an automatic adaptation of the control function 15 of the control unit 13, based on at least the second input data $\mathbf{14}_2$, 18 received from the first or a second sensor 11, 19 without any required dedicated user interaction.

Furthermore, the adaptation unit 17 may be configured to repeatedly adapt the control function 15 of the control unit 13 multiple times during the hair removal operation depending on second input data $\mathbf{14}_2$, $\mathbf{18}_1$, $\mathbf{18}_2$, . . . , $\mathbf{18}_m$ received at multiple points in time. In other words, the adaptation of the control function 15 by the adaptation unit 17 may not only be executed once during the hair removal operation. The adaptation unit 17 may be configured to receive the second input data $\mathbf{14}_2$, 18 several times, i.e. at multiple points in time, during the hair removal operation. This becomes clear since the input data $\mathbf{14}_2$, 18 may vary over time during the hair removal operation. Accordingly, the adaptation unit 17 may adapt the control function 15 repeatedly during the hair removal operation such that the adaptation may be executed in real time during a regular hair removal operation.

The adaptation unit 17 may adapt the control function 15 continuously or discontinuously. For instance, the adaptation unit 17 may continuously receive the second input data $\mathbf{14}_2$, 18 and continuously adapt the control function 15. In this case, a low pass filter may be provided between the adaptation unit and the control unit 13. Additionally or alternatively, the adaptation unit 17 may be configured to receive the second input data $\mathbf{14}_2$, 18 in discrete points in time, for example, every one second, or every three seconds, or every ten seconds.

The actuator 12 may also change the hair removal characteristic in real time, i.e. in direct response to an adaptation of its control function 15. For example, the actuator 12 may change the hair removal characteristics within fractions of seconds.

Furthermore, the automatic real time adaptation of the control function 15 may be independent from a position information relative to a body portion of the user. That is, the concept may be used anywhere on a user's body since the automatic adaptation of the control function 15 happens in real time, i.e. during execution of the hair removal operation. Accordingly, the adaptation may be executed on-the-fly so there may be no need to have any reference profiles of a certain body portion available in a storage.

Thus, the hair removal apparatus 10 may react very dynamically to changing situations during execution of the hair removal operation. The adaptation of the control function 15 may be executed within milliseconds, or even nanoseconds. That is, the adaptation unit's response time may, for example, even be equal to or lower than 0.25 s, or may be equal to or lower than 1 second. This is estimated as the time until the actuator 12 has moved significantly, e.g. half of its total travel, in case of the actuator being a hardware actuator, for instance.

Furthermore, the dynamic automatic real time adaptation of the control function 15 is based on the current handling of the hair removal apparatus 10, i.e. based on the handling of the hair removal apparatus 10 during execution of the hair removing operation. As mentioned before, different users may handle the hair removing apparatus 10 differently. However, since the adaptation of the control function 15 is based on the current handling of the hair removal apparatus, the adaptation of the control function 15 may be performed user specifically.

Before continuing with the description of further possible details of the apparatus 10, it should be noted that the apparatus may, in addition to aiming at advantageously adapting hair removal characteristic, accompany adaptations of the hair removal characteristic via the control unit and actuator, respectively, with presenting a feedback/notification signal to the user such as via a verbal announcement via the user's smartphone or an optical signal via an LED of the apparatus or the like. Advantageously, the user is notified by such feedback signal that the product is reacting or changing its behavior. The user, thus notified, may "accept" the adaptation provoked by the adaptation unit and not react by different handling in order to react to the different hair removal characteristic of the apparatus. This may avoid some sort of escalating scenario of actions and counter actions by the apparatus and user.

That is, an individual user may be determined or identified based on its personal shaving behavior, wherein the personal shaving behavior may be directly derivable from the current handling of the hair removal apparatus 10. An individual user may, for instance, be one particular member of a family.

Additionally or alternatively, different user types may be determined or identified based on their common shaving behaviors, wherein the common shaving behavior may be directly derivable from the current handling of the hair removal apparatus 10. For example, a first group of users may usually start a hair removal operation beginning at a neck portion, while a second group of users may usually start a hair removal operation at a cheek portion. Accordingly, these different groups of users may represent different user types, wherein one or more individual users may be contained in one user group.

A further example could be a different speed and/or length of a shaver stroke. For example, a first user may shave with a faster shaving speed than a second user. Additionally or alternatively, a first user may perform a longer shaver stroke than a second user.

Yet a further example could be a shave pressure. For example, a first user may exert a higher pressure on his skin while shaving than a second user.

According to such an embodiment, the adaptation unit 17 may be configured to determine an individual user or a type of user based on the second input data $14_2$, 18, and to adapt during the hair removal operation the control function 15 of the control unit 13 depending on the determined individual user or type of user, such that the control unit 13 controls the actuator 12 in response to the determined user or type of user.

Accordingly, the automatic dynamic real time adaptation of the control function 15 may be personalized. That is, each identified user, be it an individual user or a user belonging to a certain user type, may benefit from a personalized adaptation during execution of the hair removal operation. Again, said personalized adaptation is based on the hair removal behavior of the person currently handling the hair removal apparatus, wherein said handling may be determined by the first sensor 11.

The following non-exhaustive list may provide some non-limiting examples of sensors that may by comprised by the first sensor 11 and optionally by the second sensor 19, i.e. examples of sensors (black bullet points) and associated shaving behaviors as parameters (white bullet points):

Shaving behavior may be related to the human handling of the shaver. Parameters measured may be relative (e.g. position/movement relative to face of user or other objects) or otherwise, e.g. absolute. These parameters may represent the parameters that may be sensed by the first sensor 11 in order to determine the current handling of the hair removal apparatus 10. However, these parameters may also be examples for parameters that may be sensed by the second sensor 19:

- Accelerometers
  - Stroke properties such as speed, acceleration, length, direction, orientation, frequency, pattern, repetitive strokes over the same area and all derivatives of these quantities
  - Device orientation and movement, such as position, acceleration, speed, movement frequencies, movement pattern and derivatives of these quantities
  - Vibrations of the shaver head, the shaver handle, cutting elements or skin areas
- Gyroscope
  - Stroke properties such as direction, orientation, frequency, pattern, related to rotational movements of the shaver and all derivatives of these quantities
  - Orientation and movement of device/parts of device (e.g. head/body), such as position, acceleration, speed, movement frequencies, movement pattern, related to rotational movements of the shave and derivatives of these quantities. These may be measured in absolute terms and/or relative to other objects such as the user's face or arm/hand.
- Motion Tracking/Motion Capturing
  - Stroke properties such as speed, acceleration, length, direction, orientation, frequency, pattern, and all derivatives of these quantities
  - Device orientation and movement, such as position, acceleration, speed, movement frequencies, movement pattern and derivatives of these quantities
  - User orientation and movement, such as position, acceleration, speed, movement frequencies, movement pattern, use of second hand (e.g. for skin stretching or trying to get a single missed hair). This can be absolute or relative to the shaver or any other object such as a bathroom mirror
- Optical Sensor, such as camera systems or other
  - Grimaces
  - Tipping of head
  - Skin tensions or folds
- Pressure, e.g. capacitive or resistive touch sensors or other
  - Skin contact force between face and cutting parts/shaver head
  - Force on each cutting element and distribution across the different elements
- Touch Sensor, e.g. capacitive or resistive touch sensors
  - Gripping force
  - Gripping surface—location & area
  - Type of grip
- Force Sensor (1D, 2D, 3D, xD)
  - Resultant direction that the user is pressing the device against the skin
- Hall Sensor
  - Movements of parts of the shaver relatively to each other due to external forces

- Motor current based detection systems
  - Skin contact force
  - Hair cutting activity
  - Wear/state of cutting elements The above listed sensor types may be comprised by the first sensor 11 and optionally by the second sensor 19, and they could be in the shaver 10 itself or external to the shaver 10, e.g. motion tracking equipment, wearable electronics (e.g. smart watch) or in an external device such as a smart phone.

Thus, according to an embodiment the hair removal apparatus 10 may comprise a housing, wherein the housing may comprise both the first sensor 11 and the second sensor 19. That is, both sensors 11, 19 may be internal sensors that may be integrated into the hair removal apparatus 10.

Alternatively, at least one of the first sensor 11 and the second sensor 19 may be external from the housing of the hair removal apparatus 10. In one example, the housing may comprise the first sensor 11, such that the first sensor 11 is an internal sensor, and the second sensor 19 may be external from the housing of the hair removal apparatus 10.

Furthermore, combining multiple sensor signals to obtain a holistic representation of the shaving behavior can lead to a better result than when only a single sensor is used. Thus, a much better result can be achieved by a shaver that e.g. bases the adjustment on data from multiple sensors and/or multiple types of sensor or that can adjust different/multiple shaver parameters.

The above discussed shave behavior may be related to the human handling of the shaver, which may be determined by the first sensor 11. It may not be biological characteristics, e.g. not hair or skin properties or facial contours etc.

Following may not be examples of shave behavior:

- current consumption (current can however be used as a "sensor" to detect behaviors)
- turning a dial, moving a switch, pressing a button, etc.
- changing of shaver head/attachment
- gestures/swipes (behavior, but not shave behavior)
- applying a substance to the skin (behavior, but not shave behavior)
- the actual substance applied to a user's skin or hair
- things that happen as a result of a shave behavior, but are not themselves shave behaviors, e.g. shape/height of skin dome
- shaving time—shaving time alone is not considered to be a shaving behavior. Shaving time might however be used in addition to other shaving behavior as inputs.

Furthermore, the device functional properties may depend on the mechanics that may be changeable by the actuator 12, and said device functional properties may be physical or other, wherein physical property may mean that a physical change occurs, e.g. change of position, change of stiffness, etc., and not purely a software change, e.g. a provision of a feedback message, changing of data transmission settings, etc. Changing one or more device functional properties may lead to a change of the hair removal characteristic.

Figure 2:
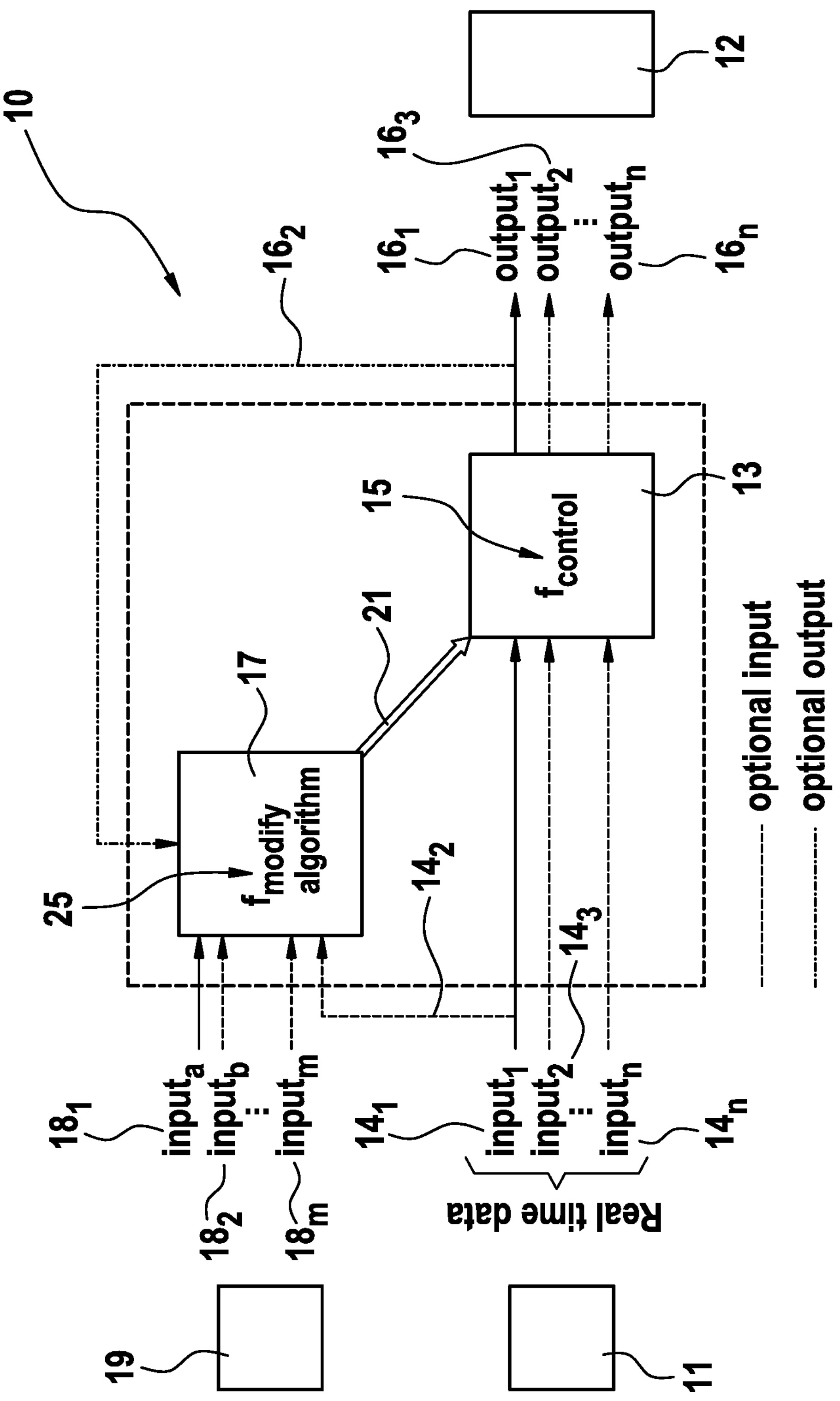
FIG. 2 shows a schematic block diagram of a hair removing apparatus according to an embodiment.

FIG. 2 shows a further schematic block diagram of an example of a hair removal apparatus 10 for describing some examples of inputs and outputs of the control unit 13 and the adaptation unit 17, respectively. Same elements as in FIG. 1 are assigned the same reference numerals.

In FIG. 2, the control unit 13 may receive the first input data $\mathbf{14}_1$ from the first sensor 11. The control unit 13 may optionally receive additional optional first input data, such as additional optional first input data $\mathbf{14}_3$, and up to an optional $n^{th}$ first input data $\mathbf{14}_n$. One or more of the additional optional input data $\mathbf{14}_3$ to $\mathbf{14}_n$ may be provided by the first sensor 11. Alternatively, the additional optional input data $\mathbf{14}_3$ to $\mathbf{14}_n$ may be provided by one or more further sensors (not depicted). One or more of the first input data $\mathbf{14}_1$ to $\mathbf{14}_n$ may be real time data, i.e. data that is collected or processed during execution of the hair removal operation.

The adaptation unit 17 may receive the second input data $\mathbf{18}_1$ from the second sensor 19. Alternatively, the adaptation unit 17 may receive the second input data $\mathbf{14}_2$ from the first sensor 11, as explained above with reference to FIG. 1. The adaptation unit 17 may optionally receive one or more additional second input data, such as additional optional second input data $\mathbf{18}_2$, and up to an optional $m^{th}$ second input data $\mathbf{18}_m$. One or more of the additional optional second input data $\mathbf{18}_2$ to $\mathbf{18}_m$ may be provided by the second sensor 19. Alternatively, the additional optional second input data $\mathbf{18}_2$ to $\mathbf{18}_m$ may be provided by one or more further sensors (not depicted).

The control unit 13 may map the first input data $\mathbf{14}_1$ to $\mathbf{14}_n$ to the output signal $\mathbf{16}_1$, as previously described with reference to FIG. 1. The control unit 13 may also map the first input data $\mathbf{14}_1$ to $\mathbf{14}_n$ to one or more additional optional output signals $\mathbf{16}_3$ to $\mathbf{16}_n$. The mapped output signals $\mathbf{16}_1$, $\mathbf{16}_3$ to $\mathbf{16}_n$ may be transmitted to the actuator 12 for controlling the actuator 12 during the hair removing operation. Further optionally, at least one of the mapped output signals may be fed back to the adaptation unit 17, such as exemplarily indicated by the output signal $\mathbf{16}_2$ which branches off from the first mapped output signal $\mathbf{16}_1$.

The above mentioned one or more second input data $\mathbf{18}_1$ to $\mathbf{18}_m$ for the adaptation unit 17 may be data collected by the hair removal apparatus itself, e.g. by means of sensors or device ICs. Additionally or alternatively, the one or more second input data $\mathbf{18}_1$ to $\mathbf{18}_m$ for the adaptation unit 17 may be data from external sources and/or may stem from multiple users, e.g. cloud, smartphone, corp. server, cleaning center, toothbrush, smartwatch, or the like.

The following non-exhaustive list may provide some further non-limiting examples for the second input data $\mathbf{18}_1$ to $\mathbf{18}_m$:

- Data collected by the device itself (Sensors, Device ICs, . . . ) and/or
- Data from external sources, could be from multiple users (Cloud, Smartphone, Corp. Server, Cleaning Center, Toothbrush, Smartwatch, . . . ) and/or
- Behavioral, environmental, physiological, etc. data and/or
- Etc.
- Real time and/or past values (Trends, Gradients, Developments, . . . )
- Can be single or multiple inputs
- Can be the same as one or more inputs to $f_{control}$
- Can be one or more outputs from $f_{control}$ Non-limiting examples of environmental data could be, for instance, data related with the temperature or humidity inside a room. For example, if the data may provide information that the temperature and/or the humidity inside the room may have increased within the last few minutes/hours, then this may be an indication that the user may have showered. In result, the friction between the hair removal apparatus and skin may be higher than usual. Thus, the adaptation unit 17 may adapt the control unit 13 accordingly in order to react to this particular situation.

Non-limiting examples of physiological data could be, for instance, data related with the physiology of the body portion to be treated with the hair removal apparatus. For example, the data may provide information about a skin moisture, a hair length, a softness or rigidity of the hair, and the like. Again, the adaptation unit 17 may adapt the control unit 13 accordingly in order to react to this particular situation.

The adaptation unit 17 may comprise an adaptation function 25 ($f_{modify\ algorithm}$) for processing the one or more second input data $\mathbf{18}_1$ to $\mathbf{18}_m$. For example, the adaptation unit 17 may be configured to receive the second input data $\mathbf{14}_2$ from the first sensor 11 and/or to receive the one or more second input data $\mathbf{18}_1$ to $\mathbf{18}_m$ from the second sensor 19 and/or from one or more additional sensors (not depicted). Furthermore, the adaptation unit 17 may be configured to map, by using the aforementioned adaptation function 25 ($f_{modify\ algorithm}$), said received second input data $\mathbf{14}_2$, $\mathbf{18}_1$ to $\mathbf{18}_m$ to an output signal 21 for adapting the control function 15 ($f_{control}$) during the hair removal operation.

As mentioned before, adapting may include modifying the control function 15 or changing the control function 15.

The control function 15 that may be implemented in the control unit 13 and the adaptation function 25 that may be implemented in the adaptation unit 17 may together provide a common function or algorithm that may herein also be referred to as the algorithm or as a self-modifying algorithm.

The adaptation unit 17 may process the second input data $\mathbf{14}_2$, $\mathbf{18}_1$ to $\mathbf{18}_m$ by using the adaptation function 25. Based on the result of this processing, the control function 15 of the control unit 13 may be adapted.

The following non-exhaustive list may provide some non-limiting examples of adaptation functions 25, i.e. the processing of the second input data $\mathbf{14}_2$, $\mathbf{18}_1$ to $\mathbf{18}_m$ may be based on:

- Statistical Moments (Mean, STD, Spread, Min/Max, RMS, Median, . . . )
- Filtering (Outliers, Noise, . . . )
- Smoothing
- Weighting
- Mapping
- Over/under-sampling
- Combination of input quantities
- how a specific parameter has changed with time
- how a specific parameter is compared to a reference parameter
- etc.

However, fuzzy logic may not be used as an adaptation function 25, since fuzzy logic is based on discrete functions varied by weighting coefficients, which are usually fixed. The functions themselves are not changed and the interdependency between factors and functions is fixed.

The adaptation function 25 may comprise a single function or multiple functions for adapting the control function 15. The control function 15, in turn, can be adapted in different ways. For example, the result of the adaptation function 25 may lead to adaptation of the control function 15 in different ways, e.g. modification of:

- Control function 15 (e.g. different curve)/data processing
- Data collection
- Which and how many input parameters/arguments into control function 15

The following non-exhaustive list may provide some non-limiting examples for the one or more first input data $\mathbf{14}_1$, $\mathbf{14}_3$ to $\mathbf{14}_n$ to the control unit 13 for being processed by using the control function 15:

- Also see outputs 21 of the adaptation function 25 ($f_{modify\ algorithm}$)
- Can be single or multiple inputs
- Data from external sources, could be from multiple users (Cloud, Smartphone, Corp. Server, Cleaning Center, Toothbrush, Smartwatch, . . . ) and/or
- Behavioral, environmental, physiological, etc. data and/or
- Except for those inputs 21 from the adaptation function 25 ($f_{modify\ algorithm}$) into the control function 15 ($f_{control}$) all other first input data $\mathbf{14}_1$, $\mathbf{14}_3$ to $\mathbf{14}_n$ to the control function 15 ($f_{control}$) may be real time data related to shaving behavior, e.g. inputs from one or more of:
  - Accelerometer
  - Gyroscope
  - Motion Tracking/Motion Capturing
  - Pressure, e.g. capacitive or resistive touch sensors or other
  - Motor current based detection systems
  - Optical Sensor, such as camera systems or other
  - Touch Sensor
  - Hall Sensor
  - Capacitive Sensor
  - Force Sensor (1D, 2D, 3D, ×D)
  - etc.

The purpose of the control function 15 ($f_{control}$) is to drive an actuator 12 to adjust a shaver property. The control function 15 may comprise a single function or multiple functions. The following non-exhaustive list may provide some non-limiting examples for the implementation of the control function 15:

- may interpret sensor/input data and may determine an output signal, and/or
- may control actuator 12 based on or as a function of the sensor/input data, and/or
- may be installed in a control unit 13
  - e.g. microprocessor, miniature PC (Arduino, Raspberry Pi, . . . ), industrial PC, smartphone, smart device, smart watch or other smart wearable, cleaning center, cloud based Furthermore, the following non-exhaustive list may provide some non-limiting examples for the above described one or more outputs $\mathbf{16}_1$ to $\mathbf{16}_n$ of the control unit 13:

- Output can be real time or delayed
- Can be single or multiple outputs $\mathbf{16}_1$ to $\mathbf{16}_n$
- Examples for actuators 12 that may be controlled based on the output $\mathbf{16}_1$ to $\mathbf{16}_n$ of the control unit 13 can be via one or more of:
  - a servomotor
  - a gear motor,
  - a controllable brake e.g. magnetic or eddy-current
  - a controllable damper
  - a solenoid
  - a piezoelectric element
  - a piezoelectric drive
  - an electroactive polymer
  - a memory metal (e.g. activated via e.g. a heating element)
  - a bimetallic actor (e.g. activated via e.g. a heating element)
  - a pneumatic drive
  - a linear drive
  - etc.

The actuator 12 is to perform the adjustment of the physical functional element of the hair removal apparatus 10 in order to achieve a certain hair removal characteristic. In some embodiments, the adjustment may be performed via a dedicated actuator, as all the above listed are. A dedicated actuator means that an extra component (e.g. an extra servo motor) would be foreseen to actuate the adjustment, compared to the same shaver without this adjustment feature.

This may be necessary in order e.g. to make the adjustment more obvious to the user. While on the one hand, the adjustment should happen automatically and the desired consumer benefit is the result of the adjustment (e.g. more control) rather than the change itself (e.g. a stiffer neck is not the direct benefit), research has shown that the consumer often has more confidence in the product, if he is also able to notice that the product is doing something.

Examples of dedicated actuators 12 that could drive such an adjustment:

- Servomotor
- gear motor,
- controllable brake e.g. magnetic or eddy-current
- controllable damper
- solenoid
- piezoelectric elements
- piezoelectric drives
- electroactive polymers
- memory metal (e.g. activated via e.g. a heating element)
- bimetallic actors (e.g. activated via e.g. a heating element)
- pneumatic drive
- linear drives
- etc.

However, the shaver motor itself may not be considered a dedicated actuator. Research has shown that the benefit from a change in motor amplitude or frequency is not easily noticeable to an untrained user.

As a special example, inputs into the function fcontrol that control the actuator, i.e. first inputs, may be, for instance, measurements on pressure onto the skin, measurements on a cutting activity of the shaver and a measurement of an acceleration of the shaver in all three dimensions. Likewise, a specific example for a combination of second Inputs used the function fmodify that modifies the control function, in turn, may include measurements on pressure exerted onto the skin, cutting activity of the shaver, and the shaver's acceleration in all three dimensions.

According to an example of the hair removal apparatus 10, feedback/information/etc. may optionally be given in addition to the adjustment. While research has shown that consumers do not like being told what to do by products, some feedback/information in addition to the automatic adjustment may be helpful. For example, this may be one way to make an adjustment subtly noticeable (see point above for consumer relevance). This could be as simple as e.g. a LED lights when the adjustment takes place to much more high-level information. Important however is that the shaver has the automatic adjustment in addition to this optional extra information/feedback: as discussed in the introductory session, the user cannot always correctly judge what the best adjustment is and may even not believe this, even if the device provides this information.

An alternative means to make the adjustments more noticeable might be in the form of a start-up mode (e.g. quick adjustment of the property to an extreme value and then back to the starting value when the shaver is initially turned on).

According to a further example, the hair removal apparatus 10 may optionally have an override function to enable the user to set/use a different device functional property (adjustment) from that determined by the control unit 13 and/or the adaptation unit 17.

According to yet a further example of the hair removal apparatus 10, there may be an additional possibility for the user to select different "modes". For example, "sport mode" or "comfort mode" which introduces a further parameter to how the hair removal apparatus 10 adjusts on top of that already described here, e.g. might influence how quickly the self-modifications take place. This is however not to be confused with the use of "profile" in prior art. The "mode" itself would not "define" the device functional adjustment, rather the self-modifying algorithm (i.e. control unit 13 and adaptation unit 17) would still form the basis of the determination for the device functional adjustment, the "mode" would add an additional factor on top, i.e. the selection of a "mode" does not predetermine the adjustment.

Figure 3A:
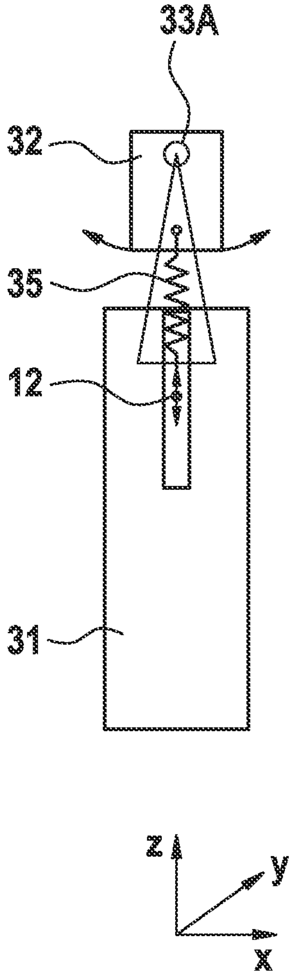
FIG. 3A shows a schematic side view of a hair removing apparatus according to an embodiment.
Figure 3B:
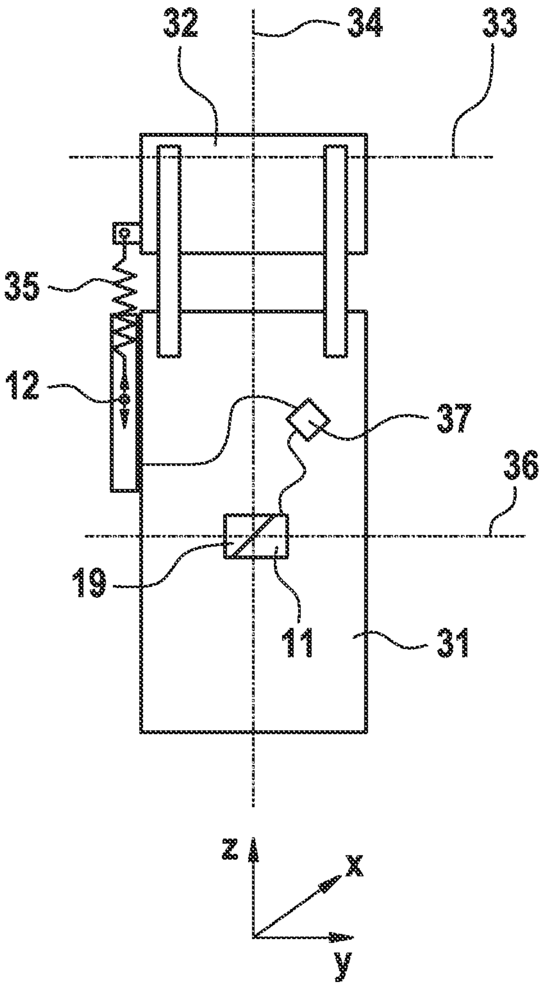
FIG. 3B shows a schematic front view of a hair removing apparatus according to an embodiment.
Figure 4:
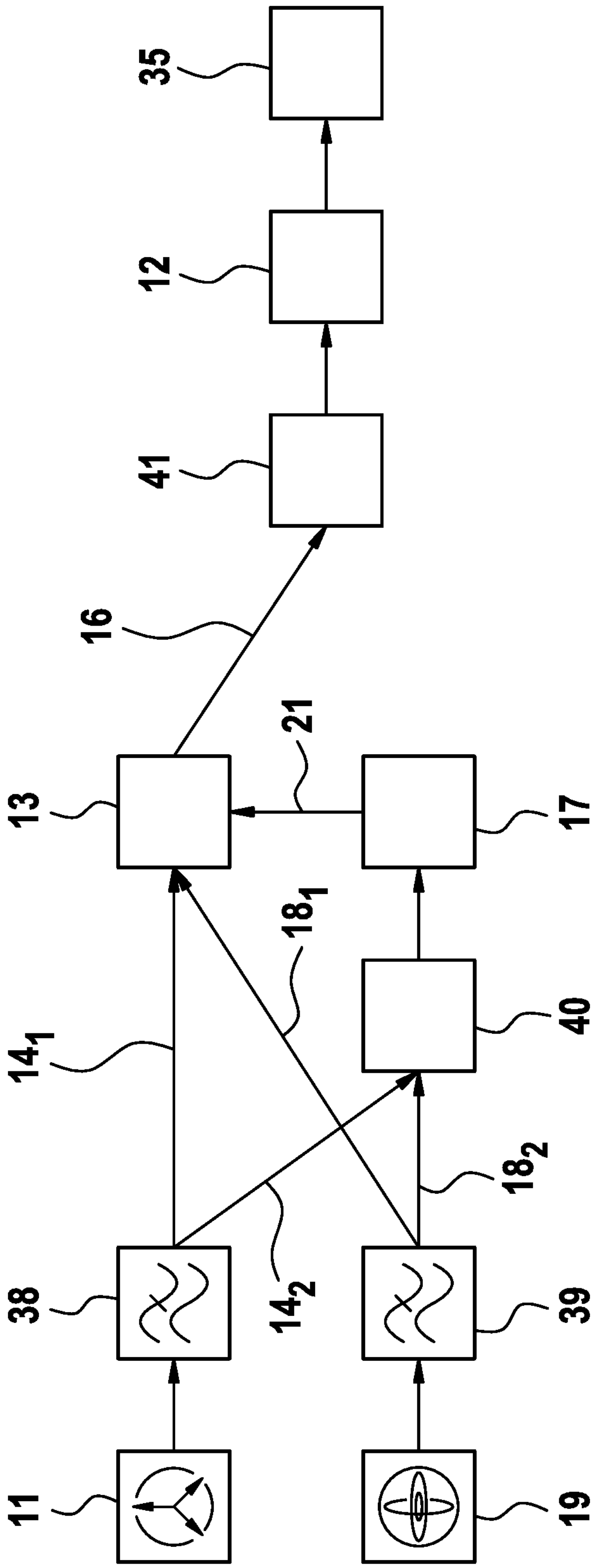
FIG. 4 shows a schematic block diagram for visualizing an information flow in a hair removing apparatus according to an embodiment.

FIGS. 3A and 3B show a further embodiment of a hair removal apparatus 10, which in this case is a shaver. FIG. 3A shows a side view of the shaver 10, and FIG. 3B shows a front view of the shaver 10. Furthermore, FIG. 4 shows a schematic block diagram of the functional components and the information flow in the shaver 10.

The shaver 10 may comprise a shaver handle 31 and shaver head 32 which is movable relative to the shaver handle 31 with at least one degree of freedom (e.g. rotation of shaver head 32 with respect to a rotation axis 33 (herein called swivel axis) that is oriented orthogonally to the shaver handle's longitudinal axis 34). The shaver handle 31 may be equipped with an accelerometer sensor and a gyroscope, as is also depicted in FIG. 4.

The accelerometer may be set up in a way to determine the spatial orientation and movement of the shaver 10 in relation to the surrounding gravitational field. The gyroscope may be set up to determine twisting of the shaver 10 about its longitudinal axis 34. At least one of the accelerometer and the gyroscope may be comprised by the first sensor 11 for determining the current handling of the hair removal apparatus 10. However, at least one of the accelerometer and the gyroscope could, additionally or alternatively, also be used as the second sensor 19 for providing respective sensor data to the adaptation unit 17. Both said cases are depicted in FIG. 4.

According to the example as depicted in FIGS. 3A and 3B, the first sensor 11 may comprise said accelerometer that may be configured to determine the current handling of the shaver 10 by sensing an acceleration of the shaver 10 during the shaving operation, and to provide acceleration sensor data as the first input data $\mathbf{14}_1$ to the control unit 13 and/or to provide the acceleration sensor data as the second input data $\mathbf{14}_2$ to the adaptation unit 17.

Furthermore, according to this example the second sensor 19 may comprise the gyroscope that may be configured to determine the current handling of the shaver 10 by sensing a rotation of the shaver 10 during the shaving operation, and to provide gyroscope sensor data as the second input data $\mathbf{18}_2$ to the adaptation unit 17. Additionally or alternatively, the gyroscope may be configured to provide the gyroscope sensor data as the first input data $\mathbf{18}_1$ to the control unit 13, as depicted in FIG. 4.

Alternatively, it may also be possible that the first sensor 11 comprises both the accelerometer and the gyroscope, wherein the accelerometer may be configured to determine the current handling of the shaver 10 by sensing an acceleration of the shaver 10 during the shaving operation, and to provide acceleration sensor data as the first input data $\mathbf{14}_1$ to the control unit 13 and/or to provide the acceleration sensor data as the second input data $\mathbf{14}_2$ to the adaptation unit 17, and wherein the gyroscope may be configured to determine the current handling of the shaver 10 by sensing a rotation of the shaver 10 during the shaving operation, and to provide gyroscope sensor data as the second input data $\mathbf{18}_2$ to the adaptation unit 17 and/or to provide the gyroscope sensor data as the first input data $\mathbf{18}_1$ to the control unit 13.

Further alternatively, it may also be possible that the second sensor 19 may comprise both the accelerometer and the gyroscope The relative movement of the shaver head 32 relative to the handle 31 may be controlled by an actuator 12 such as, for instance, in terms of swiveling stiffness. For example, a servomotor may be used to this end, which may be set up to adjust a swiveling force of the shaver head 32 relative to the shaver handle 31, for example by changing the preload of a spring 35 that connects the shaver handle 31 to the shaver head 32. The actual function that steers the actuator 12 may be based on the individual user's shaving behavior. As can be seen in FIG. 4, said actual function may correspond the above described output signal 16 of the control function 15 that may be implemented in the control unit 13.

From consumer research, it is known that many users, when shaving their neck, turn their shaver 10 around its longitudinal axis 34 and change their grip such that the shaver's front side points away from the user. Then, the shaver 10 is rotated around an axis 36 that is parallel to the swivel axis 33. The user's intent of this behavior is to shave against the grain to obtain a closer shave in this area which is often hard to achieve. The unresistant/easy running/smooth swivel motion of the shaver head 32 is in this case counterproductive; therefore it is of interest to increase the preload of the spring 35 that connects head 32 and handle 31.

The extent to which the users rotate the shaver and the speed at which they do this varies greatly, not only between different users but as well between different shaves or even during a shave. Therefore, an automatic self-modifying algorithm is provided within the shaver's electronic unit 37. Said algorithm corresponds to the above described automatic dynamic real time adaptation of the control function 15. Therefore, the electronic unit 37 may comprise the control unit 13 comprising the control function 15 for controlling the servomotor 12 for adjusting the swiveling force, e.g. by adjusting the preload of the spring 35. Furthermore, the electronic unit 37 may further comprise the adaption unit 17 comprising an adaptation function 25 for adapting the control function 15 of the control unit 13.

The adaptation unit 17 adapts the control function 15 based on the current handling of the shaver 10, i.e. based on the second input data which may in this example be at least one of the acceleration sensor data $\mathbf{14}_2$ or the gyroscope data $\mathbf{18}_2$ (c.f. FIG. 4).

The control unit 13 uses the adapted control function 15 for controlling the servomotor 12. As depicted in more detail in FIG. 4, the control unit 13 may receive the first input data which may in this example be at least one of the acceleration sensor data $\mathbf{14}_1$ or the gyroscope data $\mathbf{18}_1$. The control unit 13 processes this first input data $\mathbf{14}_1$, $\mathbf{18}_1$ using the previously adapted control function 15. The adapted control function 15 creates an output 16 for controlling the servomotor 12. Since the output 16 derives from the adapted control function 15, the effect on the servomotor 12 will in this example be that it acts on the spring 35 and adapts the preload of the spring 35.

Thus, the adaptation unit 17 adapts the control function 15 and therefore the output 16 which leads to a different behavior of the actuator 12, even though the same first input data may be processed by the control unit 13.

Optionally, a driver 41 for the actuator 12 may be arranged between the control unit 13 and the actuator 12. The driver 41 may be fed with the output data 16 of the control unit 13 and may drive the actuator 12 based on the received output data 16. The actuator 12 may act on the mechanics 35 for adjusting a hair removal characteristic, as explained above.

For example, the shaver 10 of this embodiment may be configured to control the preload adjustment of the spring 35 based on a continuous monitoring of the accelerometer data $\mathbf{14}_1$, $\mathbf{14}_2$ and optionally the gyroscope data $\mathbf{18}_1$, $\mathbf{18}_2$, calculating sliding average and sliding spread values on different timescales (=with variable probing times). In this way, the shaver 10 may react individually to the user's shaving behavior to achieve a smoother, more effortless shave.

According to this embodiment, the adaptation unit 17 may be configured to perform a temporal statistical evaluation such as an averaging on a signal derived from the second input data $\mathbf{14}_2$, $\mathbf{18}_2$ for obtaining a statistical measure, and to adapt the control function 15 of the control unit 13 depending on the statistical measure and, optionally, a current sample of the second input data $\mathbf{14}_2$, $\mathbf{18}_2$. The temporal statistical evaluation may be performed on a temporal window of the signal derived from the second input data $\mathbf{14}_2$, $\mathbf{18}_2$ which comprises a current sample of the second input data $\mathbf{14}_2$, $\mathbf{18}_2$. The statistical measure obtained may be an average, i.e. some central tendency measure, a dispersion measure, such as a standard deviation or variance, maximum/minimum values, a root mean square, weighting, over/undersampling etc.

For example, the average value of the signal from the acceleration sensor 11 in x-direction (figure of coordinate system) may be taken. As can be seen in FIG. 4, disturbing frequency components which may result from vibrations of the shaver 10 may optionally be filtered out by the filter 38 which may be a low pass filter or a band pass filter. The signal may be used by the algorithm, i.e. by the control function 15 implemented in the control unit 13, to control the actuator 12. The position of the actuator 12 may be calculated by the control function 15 as the sum of:

- an offset (which may correspond to the above mentioned calculated average), and
- a contribution proportional to the acceleration in x-direction, measured by the acceleration sensor 11 (which may correspond to the above mentioned current sample of the second input data $\mathbf{14}_2$, $\mathbf{18}_2$).

Further optionally, the algorithm, e.g. the adaptation function 25 implemented in the adaptation unit 17, may comprise a low pass filter 39 for removing disturbing frequency components above a specific value of e.g. 1 Hz. An optional logic block 40, which may be comprised by the adaptation unit 17, may calculate the sliding average of the x-value of the acceleration sensor 11 based on the second input data $\mathbf{14}_2$. In other words, the optional logic block 40 may be an extractor for an extraction of summarizing values.

The logic block 17, i.e. the adaptation unit 17, may then take this calculated average value from the extractor 40 continuously, i.e. frequently and without being triggered by the user, and may replace the before mentioned offset in the algorithm, i.e. in the control function 15 implemented in the control unit 13, with this value.

A time constant, or time interval, for calculating the above mentioned average or statistical measure may, for example, be as long as the duration of an average shave. According to an embodiment, the adaptation unit may be configured to perform the temporal averaging or statistical evaluation over one time interval that is as long as the duration of an average hair removal operation, or to perform the temporal averaging or statistical evaluation over one time interval that is as long as the current hair removal operation, or to perform the temporal averaging or statistical evaluation over at least two time intervals of differing length, each being as long as an average stroke during a hair removal operation such as between half and three times an average stroke long. The one or more time intervals may be, for instance, between 1 second and 10 seconds long or lower than 30 seconds, respectively. The temporal averaging or statistical evaluation may be performed by averaging, or statistical evaluation of, one or more adaptation unit's input signals $14_2$, $18_2$ or a signal derived therefrom by combination over a moving window extending over a past temporal interval of a predetermined length. The temporal averaging may have an infinite impulse response by continuously updating an average value using a weighted average of a current sample and the most recent version of the average. In the latter case, the time interval of averaging could be interpreted as the past time interval which contributes more than 90% to the update of the average. The following description focusses on the averaging as one component of statistical averaging, but all these examples may be abstracted to by changing this to be any statistic evaluation.

In this case, it is chosen to take changes in user shaving behavior with time into account (e.g. when the shaving behavior changes in summer or winter time), so e.g. the last ten shaves may be stored and used to adapt the reference values of the algorithm 15 to fit this particular user. Alternatively, all previous shave values can be considered for the modification of the algorithm 15, wherein a higher weighting may be given to more recent shaves.

According to an embodiment, the adaptation unit 17 may be configured to store the average during or upon an end of the hair removal operation, and to use the stored average at a beginning of a subsequent hair removal operation for adapting the control function 15 of the control unit 13.

Furthermore, as exemplarily depicted in FIG. 4, the success rate of identifying the need for this adjustment can be further increased by optionally also integrating the sensor data from the gyroscope 19, optionally filtered by filter 39 into the algorithm's calculation, as consumer research has also shown that in such moments the user will increase their twisting of the shaver body 31 around its longitudinal axis 34.

The hair removal apparatus 10, i.e. shaver, may optionally have an interface to enable connection for data transfer, either to transfer data from outside to the shaver's microprocessor, e.g. to update its functionality for improvement of its behavior determined, or to transfer data from the shaver 10 to outside, e.g. to display information on a smart phone or other measurement data for determining just-mentioned improvements.

A further embodiment shall now be described, again with reference to FIGS. 3A and 3B. As mentioned before, said Figures depict a shaver 10 comprising a handle 31 and a shaver head 32 which are coupled by a spring 35. The spring 35 may be configured to adjust a swivel force of the head 32, as shall be briefly explained in the following.

The shaver 10 has the shaver head 32 mounted so that it can swivel or tilt relative to the body 31. A flexible shaving head 32 gives freedom how to hold the shaver 10, while enabling good adaptation to different face regions. The shaving head 32 can follow the different contours of checks, neck and jawline. This also ensures that for as much of the time as possible the complete cutting element area is in contact with the skin independent of the angle at which the user holds the shaver 10 (within a certain range). This ensures maximum cutting area contact with the face and brings the advantages of better efficiency (a quicker shave) and better skin comfort as the pressing force is spread over a larger area leading to lower pressure on the skin.

Depending on the setup of the adaptation system, the feeling on skin and the way the shaving head 32 moves over it is very different. A highly flexible and soft setup is preferred to glide smooth over contours without a lot of attention of the consumer is required. The buying decision on shelf is also influenced by the flexibility of the shaving system when people touch and feel demo units. All these reasons have led to shaver design typically aiming to create as low a resistance as possible to the swiveling motion as possible.

However, it has been identified that for certain shave behaviors and/or at certain moments in the shave, a light moving swivel can be disadvantageous. Two examples are listed below:

1. a feeling of a loss of control can arise when a man presses his shaver with particularly high pressure against his face and the head 32 swivels away suddenly
2. not easy to apply targeted high pressure to a single foil (e.g. some men do this to increase the pressure at the end of the shave for increased closeness). A light swivel typically results in the head 32 rotating so that all cutting elements touch the face. Some men counteract this by holding the shaver handle 31 at an extreme angle so that the head 32 cannot swivel any further. However this is unergonomic.

The current solution typically offered for these issues is a manual lock for the shaving head which can be activated. The consumer can decide between the flexible and the locked settings, however this can be inconvenient, is an extra step and consumers often try other alternatives (e.g. holding the head with their fingers). Research has shown that the manual lock is often not preferred.

This embodiment takes a different approach by automatically adapting the force that resists the swivel movement based on behavioral detection (e.g. detects shaving pressure, detects direction and speed of movements, detects angle of shaver handle, detects which cutting elements have contact to the skin). And in particular, this embodiment offers a solution for all users, despite the very wide range of different shaving behaviors that are used by different men in that the algorithm that controls the swivel stiffness modifies itself based on the typical behavior of this particular user that it detects in the present moment and over time.

As shown in FIGS. 3A and 3B, the shaver 10 may comprise a swivel head 32 and may be equipped with a pressure sensor 19 and a sensor that may detect directions and speed of motion 11, for example an accelerometer. The shaving pressure may be measured, for example, by using a pressure sensing algorithm from the shaver's motor power consumption which is deduced from the shaver's PCB. Mounted on the PCB may be an accelerometer 11 also. It may detect acceleration of all three axes of the shaver 10.

The electronic unit 37, which may comprise the control unit 13 and/or the adaptation unit 17, may receive the signals from the pressure sensor 19 and the accelerometer 11. From the accelerometer 11, the electronic unit 37 may determine the frequency and the length of the shaving strokes. For example, the accelerometer 11 may provide acceleration sensor data as first input data to the control unit 13. The control unit 13 may process said acceleration sensor data using a control function 15. The output 16 of the control function 15 may be used to steer the actuator 12.

In real time, those values from the accelerometer 11 may be used to evaluate a set of characteristic curves in the electronic unit 37 to generate an input signal for the actuator 12. This may be equivalent with getting an output value from the set of characteristic curves to steer the actuator 12. In this example the actuator 12 may be used to pull the spring 35 to set a specific stiffness of the swivel head 32. Said set of characteristic curves may correspond to a set of preconfigured control functions 15*a* being available in the control unit 13.

According to an embodiment, the control unit 13 may comprise a set of preconfigured control functions 15*a*, wherein the adaptation unit 17 may be configured to adapt during the hair removal operation the control function 15 of the control unit 13 by selecting, during the hair removal operation, one of the preconfigured control functions 15*a* based on the second input data. In other words, a set of preconfigured control functions 15*a* may be available in the control unit 13, as described above. The adaptation unit 17 may provide an instruction to the control unit 13 for instructing the control unit 13 which one of the set of preconfigured control functions 15*a* the control unit 13 shall select as the current control function 15. This is based on the current handling of the shaver 10 and done during execution of the shaving operation. Accordingly, this embodiment may describe an example for adapting the control function 15 by changing the control function 15, i.e. selecting a specific control function that may be best suited for the current handling of the shaver 10 during the current shaving operation.

According to a further embodiment, the control function 15 may be adapted by modifying, for example by updating one or more parameters of the control function 15 or of the predetermined set of control functions 15*a*. For example, the adaptation unit 17 may provide an instruction to the control unit 13 for instructing the control unit 13 to modify, e.g. to update, the parameter/s of at least one of the characteristic curves, as will be explained in the example below.

The set of characteristic curves which determines the driving signal for the actuator 12 may be constantly adapted to the specific user by monitoring the user's behavior. For example, based on previous usage, the algorithm, e.g. the adaptation unit 17, may adjust the e.g. pressure ranges that are considered to be "low", "medium" or "high". For example for a man who typically shaves with a pressure of 1-2 N, the shaver 10 would learn to consider 2 N to be a high pressure for this user, whereas for a man who typically shaves with a pressure of 3-5 N, the shaver would learn to consider 2 N to be low pressure for this user. These ranges may then be used to update the parameters of the characteristic curves.

Accordingly, in this embodiment the adaptation unit 17 may be configured to alter a parametrization of at least one preconfigured control function contained in the set of preconfigured control functions 15*a* based on the second input data.

As mentioned in the above example, the control unit 13 may use a set of predetermined control functions 15*a* (e.g. characteristic curves). This set 15*a* may comprise different control functions for processing the first sensor data, for example one control function for processing "low" pressure data, one control function for processing "medium" pressure sensor data, and one control function for processing "high" pressure data. In this case, the control unit 13 may classify a currently sensed pressure sensor data into one of at least two classes, i.e. the control unit 13 may determine whether a currently sensed first sensor data may be "low", "medium" or "high".

The control unit 13 may base the classification on a threshold value. For example, if the received pressure sensor data is below a threshold value, it may be determined to be classified into a first class, e.g. into the "low" pressure class. If the received pressure sensor data is above the threshold value, it may be determined to be classified into a second class, e.g. into the "high" pressure class.

Thus, according to this embodiment the control unit 13 may be configured to perform a classification for classifying the received first input data, wherein the classification is performed by thresholding using a threshold value, wherein the received first input data is classified into one of at least two classes if the value of the first input data is below or above the threshold value. Alternatively, the classification may be performed by a neural network or ML classifier, an example of which is given further below in this text with reference to FIG. 5.

Each class "low", "medium" and "high" may comprise at least one value or a value range. For example the class "low" may comprise a pressure range between 1 N and 2N, and the class "medium" may comprise only a single pressure value of 3 N.

However, these pressure values or ranges that are considered to be "low", "medium" or "high" may be adapted by the adaptation unit 17.

For example, the adaptation unit 17 may store one or more second input data, e.g. pressure values that have been sensed by the pressure sensor during execution of the shaving operation. During or upon the end or after the shaving operation, the adaptation unit 17 may calculate an average of the pressure sensor values that have been sensed during shaving. The adaptation unit 17 may calculate the average from the very first shaving operation executed by the user. For example, the adaptation unit 17 may start calculating the average after a certain time span during the shaving operation has elapsed. For instance, the adaptation unit 17 may start calculating the average after 1 second, or after 10 seconds, or after 20 seconds from the beginning of the current shaving operation.

For example, an average value for a "high pressure" shaving man may be about 5 N, while an average value for a "low pressure" shaving man may be about 2 N. This calculated average may then, for instance, be used by the control unit 13 as an adapted/updated threshold value for performing the above discussed classification. Accordingly, the threshold of the control unit 13 may be constantly adapted by the adaptation unit 17. In more detail, the control function 15 (e.g. classification) using the threshold for processing (e.g. classifying) the first input data may be adapted by the adaptation unit 17 based on the second input data. The first input data and the second input data may both be provided by the pressure sensor.

According to this embodiment, the adaptation unit 17 may be configured to adapt, based on the second input data, the classification of the first input data performed by the control unit 13, wherein the adaptation unit 17 is configured to calculate an average value of the second input data obtained during the hair removal operation, and to replace the threshold value of the control unit 13 by this average value.

The adaptation unit 17 may calculate an average value for each shaving operation and it may adapt, e.g. update, one or more previously calculated average values. That is, the threshold value may be adapted, e.g. updated. The adaptation by the adaptation unit 17 may be continuous. It may be performed one or several times during one shaving operation, or it may be performed one or several times over two or more shaving operations.

In other words, the self-modifying phase may start with the beginning of the first shave: the electronic unit 37 of the shaver 10 may create medium values. The more shaves are done, the higher is the accuracy of the stored typical range.

Furthermore, in the embodiment discussed above, the first sensor may comprise at least one of a pressure sensor and an accelerometer, wherein the pressure sensor is configured to determine the current handling of the hair removal apparatus by sensing a pressure that is exerted by the hair removal apparatus onto a user's skin during the hair removal operation, and wherein the accelerometer is configured to determine the current handling of the hair removal apparatus by sensing at least one of the frequency and the length of a hair removing stroke during the hair removal operation.

As previously described above, the control unit 13 may classify the first input data, for example by using a neural network which may also be referred to as a self-modifying classifier. Additionally or alternatively, the adaptation unit 17 may comprise a self-modifying classifier, e.g. a neural network.

Figure 5:
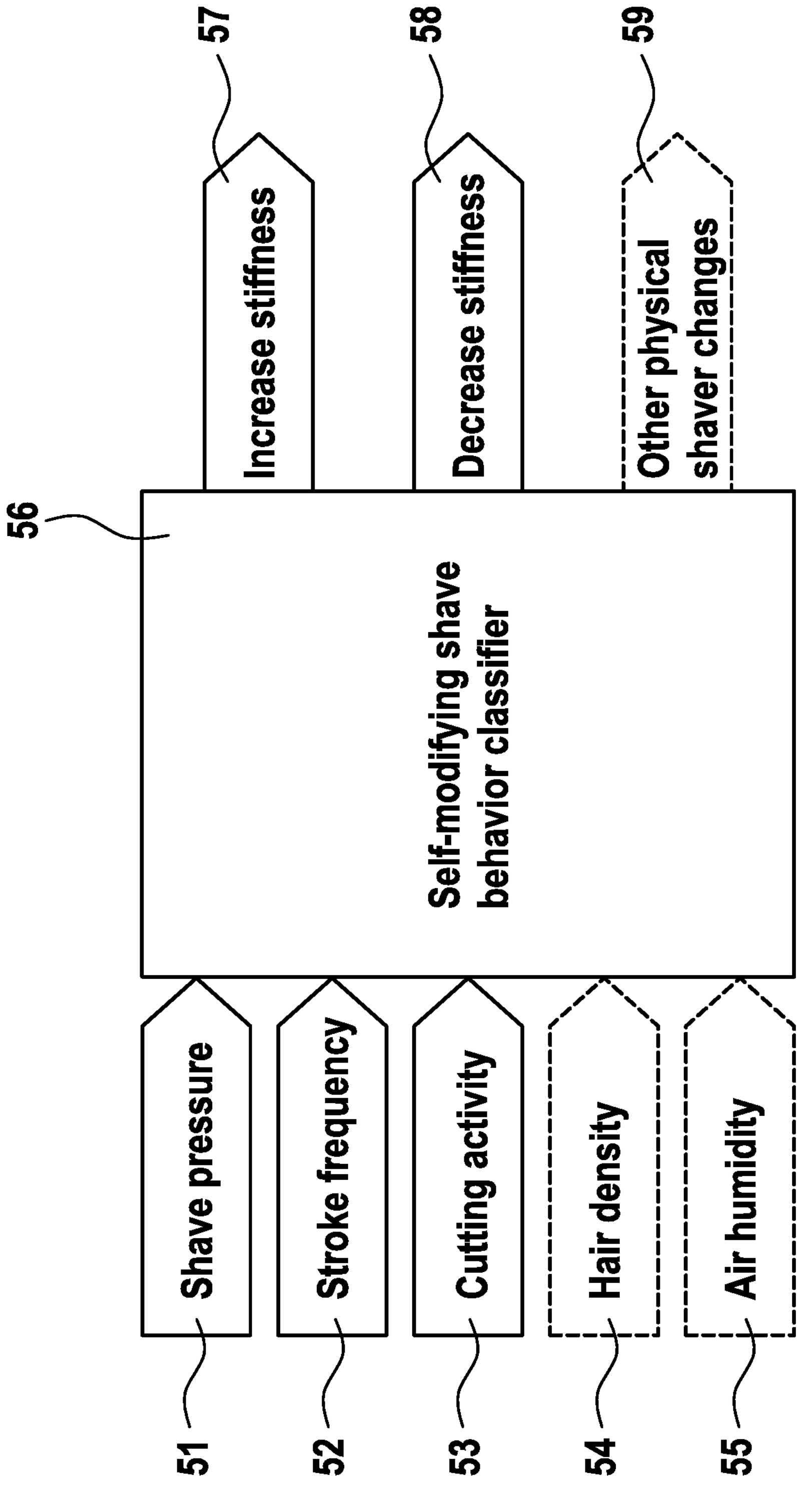
FIG. 5 shows a schematic block diagram of a self-modifying classifier according to an embodiment.

FIG. 5 shows an example for a self-modifying classifier 56. In this example, the algorithm defining the feedback of the shaver 10, as described in the previous example, may comprise a self-modifying classifier, e.g. a neural network. In this case, the outputs of the sensors, e.g. shave pressure 51, stroke frequency 52, cutting activity 53, hair density 54, air humidity 55, may be linked to the input nodes of one or more shaving behavior classifiers 56. In the subsequent (hidden) layers of the classifier 56, the signals 51, 52, 53, 54, 55 may be processed and combined by a number of differentiating nodes. The classifier 56 may decide if the current shaving behavior requires increasing or decreasing of the shaver head retention spring preload and thus a firmer or less firm feel of the shaving system on the skin. In other words, the classifier 56 may process the input signals 51, 52, 53, 54, 55 which may be first and/or second input data, and the classifier 56 may map these input data 51, 52, 53, 54, 55 to an output 57 for controlling the actuator 12 to e.g. increase the stiffness of the shaver head, or to an output 58 for controlling the actuator 12 to e.g. decrease the stiffness of the shaver head, or to an output 59 for controlling the actuator 12 to e.g. perform any other physical changes of the hair removal apparatus 10. The classifier 56 may be self-learning.

To initially define the classifier 56, it may be trained using labelled shave behavior data of a large number of test shaves in advance (factory level). The shaver 10 may then be able to adjust itself more detailed to the user by learning his specific user behavior (user-at-home level) and his reactions to the adjustments made by the shaver 10 and/or by updating the classifier 56 with a further trained version from a web-based source (cloud level). For the latter, data of many different users and shaves may be collected to enlarge the training dataset. Training in this context means that the links between differentiation nodes may be adjusted, weighted or added/deleted systematically and automatically in order to improve the classifier performance.

The classifier 56 may comprise the control unit 13 and the adaptation unit 17. The classifier 56 may comprise a deep learning network, e.g. a recurrent neural network.

A further example of when the algorithm might self-modify is when it recognizes that it is being used by a different user (e.g. by detecting very different behavior to usual). In this case, the algorithm may modify itself back to the default/factory setting (assuming that it has already modified the setting for the first user).

The above described examples and embodiments may be used in different ways. For describing some non-limiting examples of shavers 10, reference is again made to the shaver 10 as depicted in FIGS. 3A and 3B.

As can be seen, the swivel head 32 may be mounted on a pivoting element 33A which defines the rotation axis 33, and the pivoting element 33A may be mounted on a holder of the shaver body 31. When asymmetric shaving pressure may be applied to the shaver 10 a torque occurs and the shaving head 32 swivels around its axis 33 to align on facial contours. The counterforce of the swivel head 32 is minimized to ensure a good adaptation of the shaver 10 even when low pressure is applied. A mechanism, for example the above described pulling spring 35, may be mounted between the lower end of the head 32 and the shaver body 31. The mechanism 35 sets the force to swivel the head 32. The stronger the force provided by the mechanism 35 is set the harder the head 32 can swivel. The actuator 12 may be attached to the shaver body 31, e.g. one end of the spring 35 may be attached to the shaver body 31. The actuator 12 may set a retention force of the mechanism 35 by acting on the mechanism 35. For example, the actuator 12 can set the pre-load of the spring 35 by changing the length of the spring 35. In neutral actuator position the mechanism 35 may provide a low retention force, e.g. the spring 35 may have the lowest pre-load, and the head 32 can swivel very easy. At maximum actuation, the mechanism 35 may provide a higher retention force, e.g. the spring 35 is pulled tight, and the shaving head 32 needs more shaving pressure to swivel. The consumer feels a more stiff and rigid system. The actuator 12 can set the retention force, e.g. the spring load, step-less between minimum and maximum actuation position. That is, the swiveling stiffness is changed by actuator 12, the swiveling stiffness describing a resistance of the swivel head 32 against movements thereof out of its current swivel position or out of some predefined neutral position of the swivel head 32 or, differently speaking, the swiveling resistance of the shaver head 32. The swiveling stiffness, thus, describes a resistive moment which needs to be overcome to move the head 32 out of its current swiveling position. It, thus, determines a skin contact force which is exerted onto the users' skin when moving the tip of the swiveling head over the skin, namely a resistive force. As explained above, the shaver 10 may further comprise one or more sensors, for example a pressure sensor and an accelerometer.

An embodiment concerns a shaver 10 comprising a pressure sensor that is configured for sensing a current pressure exerted by the shaver 10 on a user's skin during a shaving operation. The shaver 10 may comprise a shaver body 31 and a shaver head 32 being pivotally attached to said shaver body 31, wherein the shaver head 32 is configured to move relative to the shaver body 31 by swiveling around a pivoting axis 33.

The shaver 10 may further comprise a retention force mechanism 35 for providing a retention force to the shaver head 32, the retention force mechanism 35 being attached to the shaver body 31 and the shaver head 32, wherein a swiveling force for swiveling the shaver head 32 depends on a retention force provided by the retention force mechanism 35.

Furthermore, the shaver 10 may comprise an actuator 12 for altering the preload of the spring mechanism 35 for changing a hair removal characteristic of the shaver 10, as discussed with reference to the examples above. The actuator 12 may be a hardware actuator 12, or the actuator 12 may be a software actuator being implemented in software.

The shaver 10 may further comprise a control unit 13 for controlling the actuator 12, wherein the control unit 13 is configured to receive pressure sensor data from the pressure sensor and to map, by using a control function 15, said received pressure sensor data to an output signal for controlling the actuator 12 during the shaving operation. For example, the shaver 10 may comprise a swiveling force adjustment, wherein the control unit 13 may control the actuator 12 to actuate on the retention force mechanism 35 to provide more or less retention force, e.g. to tighten or loosen the spring 35 for increasing or decreasing the preload of the spring. In result, the swivel force for swiveling the head 32 may increase or decrease which may lead to a different shaving characteristic of the shaver 10. The control unit 13 may use an adaptive control function 15 for controlling the actuator 12.

The shaver 10 may further comprise an adaptation unit 17 that is configured to receive the pressure sensor data from the pressure sensor and to adapt during the shaving operation the control function 15 of the control unit 13 depending on the received sensor data. To take up the example above, the adaptation unit 17 may adapt the swiveling force adjustment by adapting the control function 15. An adapted control function 15 may lead to a different response behavior of the actuator 12. For example, the actuator 12 may tighten the spring 35 faster/slower, earlier/later or the like.

Additionally or alternatively, the adaptation unit 17 may be configured to receive further sensor data from a second sensor, and to adapt during the shaving operation the control function 15 of the control unit 13 depending on the received further sensor data. This further sensor data may be provided, for example, by the above mentioned accelerometer.

Figure 7:
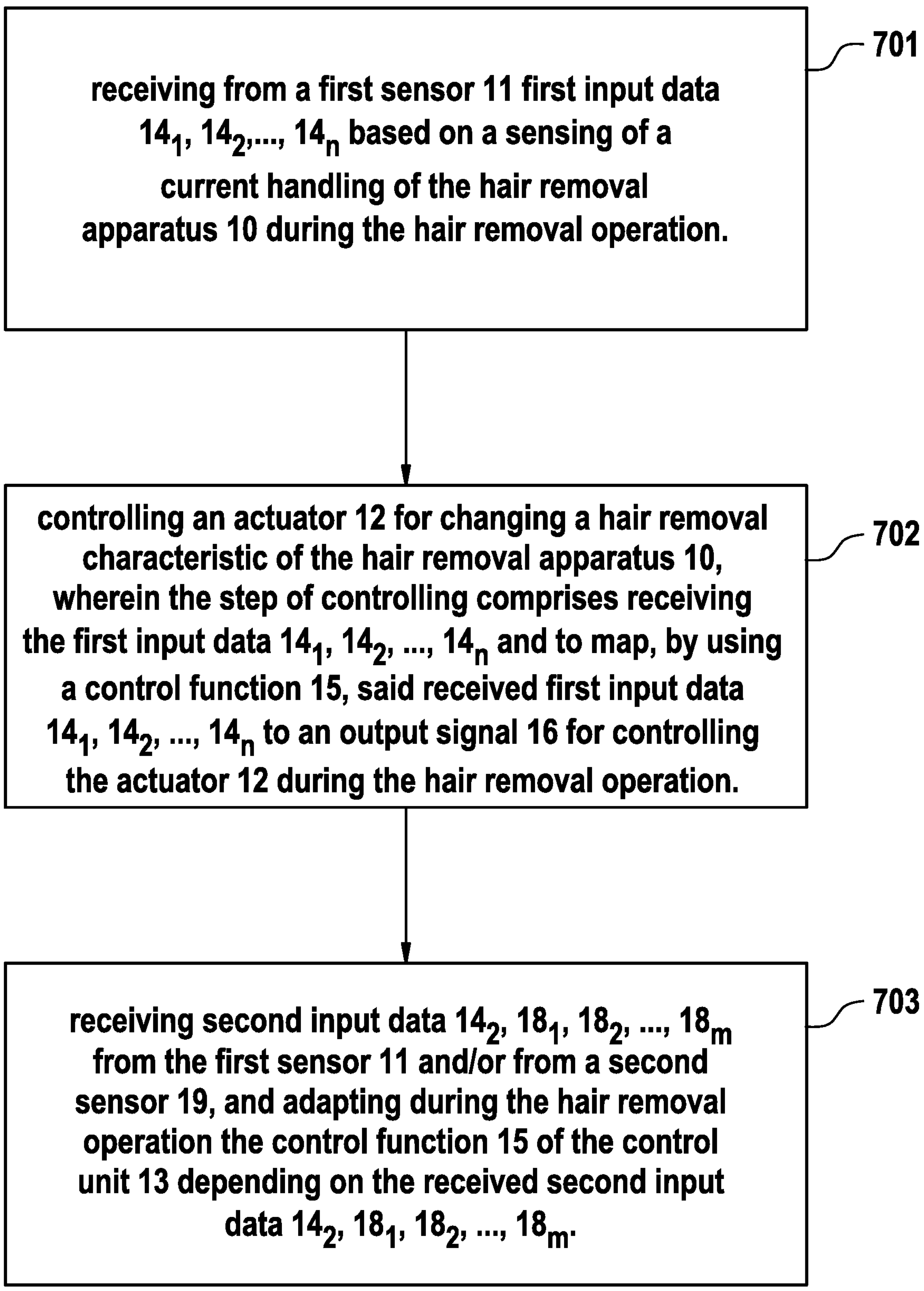
FIG. 7 shows a schematic block diagram of a method according to an embodiment.

FIG. 7 shows a schematic block diagram of a method for controlling the hair removal apparatus 10, e.g. shaver, as it was described above. In particular, FIG. 7 shows a schematic block diagram of a method for controlling a hair removal apparatus for removing hair from a body portion in a hair removal operation.

Block 701 comprises a step of receiving from a first sensor 11 first input data $\mathbf{14}_1$, $\mathbf{14}_2$, . . . , $\mathbf{14}_n$ based on a sensing of a current handling of the hair removal apparatus 10 during the hair removal operation.

Block 702 comprises a step of controlling an actuator 12 for changing a hair removal characteristic of the hair removal apparatus 10, wherein the step of controlling comprises receiving the first input data $\mathbf{14}_1$, $\mathbf{14}_2$, . . . , $\mathbf{14}_n$ and to map, by using a control function 15, said received first input data $\mathbf{14}_1$, $\mathbf{14}_2$, . . . , $\mathbf{14}_n$ to an output signal 16 for controlling the actuator 12 during the hair removal operation.

Block 703 comprises a step of receiving second input data $\mathbf{14}_2$, $\mathbf{18}_1$, $\mathbf{18}_2$, . . . , $\mathbf{18}_m$ from the first sensor 11 and/or from a second sensor 19, and adapting during the hair removal operation the control function 15 of the control unit 13 depending on the received second input data $\mathbf{14}_2$, $\mathbf{18}_1$, $\mathbf{18}_2$, . . . , $\mathbf{18}_m$.

Figure 6:
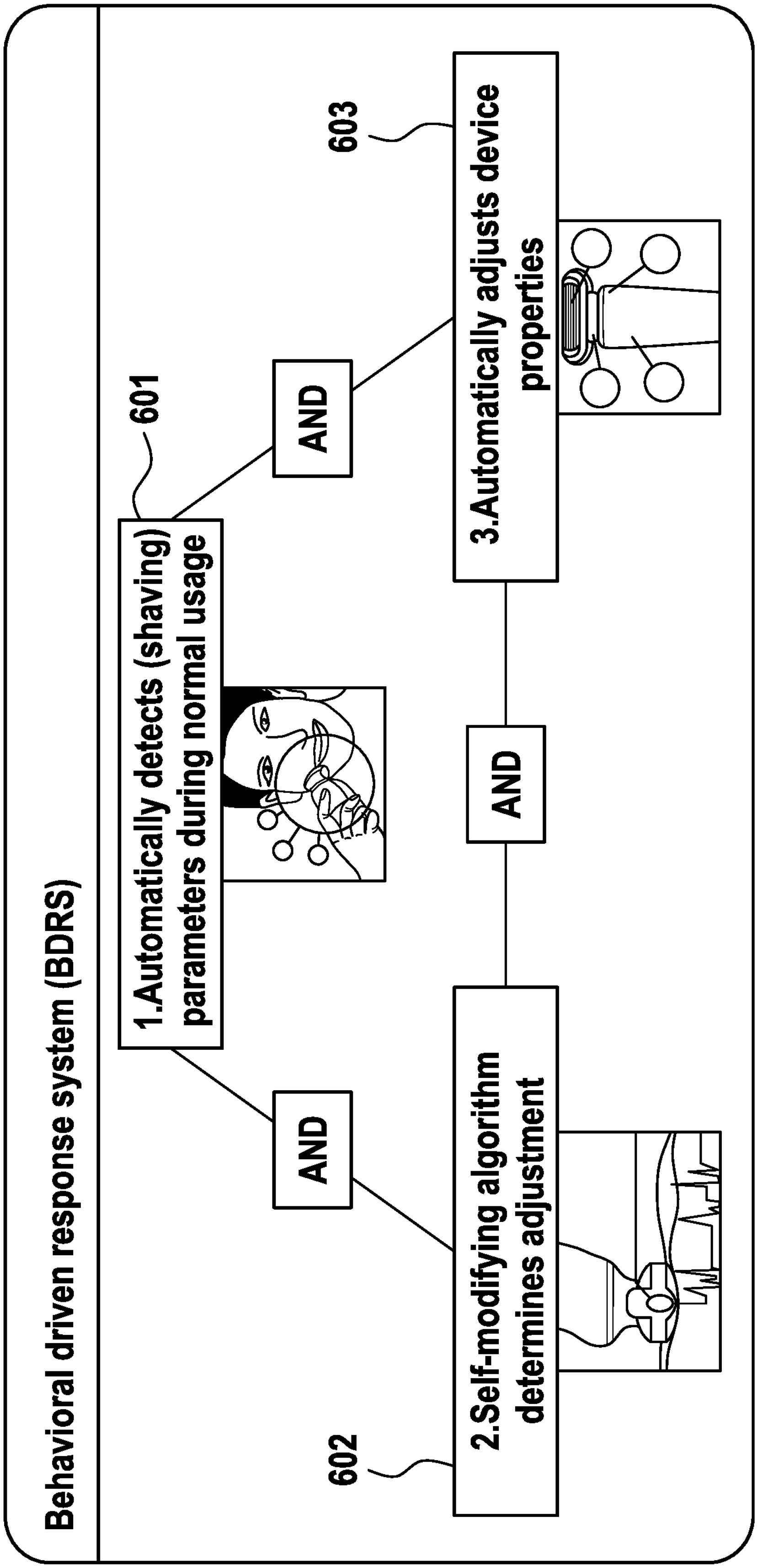
FIG. 6 shows a schematic overview of functions provided by a hair removal apparatus according to an embodiment.

Some additional embodiments or possible extension of embodiments described so far shall briefly be summarized with reference to FIG. 6 and by means of bullet points in the following list, which describes a hair removal apparatus 10, e.g. a shaver that:

1. (c.f. FIG. 6, block 601) during normal usage (and optionally before and after this usage) automatically detects parameter(s) via one or more sensors
   - these parameters are primarily shaving behavior parameters
     - the parameters may optionally be physiological properties of the man shaving, climatic conditions or other
   - the detection may or may not be continuous
   - ideally there may be multiple types of sensors, e.g. mechanical, optical, electrical, etc. and/or sensors that detect multiple types of parameters (e.g. pressure and movement)
2. (c.f. FIG. 6, block 602) determines (based on the detected sensor data/inputs) desired device functional property(s) via an algorithm/mathematical function ($f_{control}/f_{modify\ algorithm}$)
   - the device functional property(s) may be physical or other.
   - the mathematical function/algorithm is not fixed or pre-determined but instead can modify itself based on data from one or multiple sources. The modification can occur during the normal usage and is not limited to e.g. after a usage. This has the advantage that the modification and resulting benefit can occur in real time and from the first shave onwards.
3. (c.f. FIG. 6, block 603) automatically and actively adjusts this/these device functional property(s) based on output of the algorithm.
   - the adjustment of this/these functional properties improves a shaving parameter for the user. Ideally different shaving parameters can be optimized (either by adjusting the same or by adjusting different device functional properties), depending upon the specific situation.
   - feedback/information/etc. may or may not be given in addition to the adjustment
   - there may be at least one dedicated actuator to drive an adjustment As to item 1. of the above list, the expression "during normal usage" may be synonymously used herein with "during the hair removal operation" or "during execution of the hair removal operation", respectively. Accordingly, the expression "during normal usage" may mean for example that the hair removal apparatus 10 may not need to be switched into a special/calibration mode or a special calibration procedure may not need to be conducted to detect the parameters. This would be inconvenient. It also means that the data collection time is maximized which has the advantage that as much data as possible is collected and also that the data collection is always up to date.

The expression "automatically" may mean for example that the user may not need to press a switch, provide input such as answering questions, select options, etc. for the data collection to take place.

As to item 2. of the above list, the expression "based on the detected sensor data" may not include direct user input (alone), e.g. answering of questions, the user creating a profile, rating a result, pressing a button, selecting an option, etc.

As to item 3. of the above list, the expression "active" may mean that the change may not happen via a passive element (e.g. bi-metal element that purely reacts to the room temperature, a passive spring) but instead the output of the algorithm ($f_{control}/f_{modify\ algorithm}$) is to "activate" the adjustment, e.g. turn on a servo motor, set a switch, turn on a heater to activate the bi-metal element.

All of the embodiments and examples of the hair removal apparatus 10 as described above may provide the following advantages and consumer benefits:

- Bigger improvement in shaving experience and/or result
- Improvement not just for the average man, but for every user
- Direct input from the user is not required—convenient, also not limited by lack of expertise Happens automatically during normal routine—convenient, stays up to date even if conditions change, can adjust from the first shave onwards Output is not purely feedback or instructions to the user—consumer research shows that consumers do not typically like being told what to do by machines Furthermore, all of the herein discussed individual embodiments and examples of features are freely combinable with each other.

The hair removal apparatus may further be realized in the following embodiments, which are also freely combinable with each of the examples and embodiments as discussed herein:

A first embodiment may provide a hair removal apparatus for removing, in a hair removal operation, hair from a body portion, the hair removal apparatus comprising a first sensor that is configured to determine a current handling of the hair removal apparatus during the hair removal operation, an actuator for changing a hair removal characteristic of said hair removal apparatus, a control unit for controlling the actuator, wherein the control unit is configured to receive first input data from the first sensor and to map, by using a control function, said received first input data to an output signal for controlling the actuator during the hair removal operation, and an adaptation unit that is configured to receive second input data from the first sensor and/or from a second sensor, and to adapt during the hair removal operation the control function of the control unit depending on the received second input data.

According to a second embodiment with reference to the first embodiment, the first sensor may comprise at least one of the group comprising an accelerometer, a gyroscope, a motion tracking device, a motion capturing device, an optical sensor such as camera systems, a capacitive pressure sensor, a resistive pressure sensor, a capacitive touch sensor, a resistive touch sensor, a one-dimensional force sensor, a two-dimensional force sensor, a three-dimensional force sensor, a multi-dimensional force sensor for at least four dimensions, a hall sensor and a motor current based detection sensor.

According to a third embodiment with reference to the first and/or the second embodiment, the actuator may be configured to change a hair removal characteristic by acting on a dedicated actuator for adjusting at least one of the group comprising a height of different cutting elements and/or non-cutting elements (e.g. guard, combs, etc.) relative to each other, a blade frequency, a blade amplitude, a floating force of individual cutting elements, a force needed to swivel/tilt head, a ratio between area of cutting parts to area of non-cutting parts (e.g. head frame) in contact with user's skin, a skin tensioning element, a 3D angle of head relative to body, a height of head relative to body, a foil hole size/pattern, a shaver head vibration, a handle vibration, a sound of motor.

According to a fourth embodiment with reference to one of the preceding embodiments, an actuator may comprise at least one of the group comprising a servomotor, a gear motor, a controllable brake e.g. magnetic or eddy-current, a controllable damper, a solenoid, a piezoelectric element, a piezoelectric drive, an electroactive polymer, a memory metal (e.g. activated via e.g. a heating element), a bimetallic actor (e.g. activated via e.g. a heating element), a pneumatic drive, and a linear drive.

According to a fifth embodiment with reference to one of the preceding embodiments, wherein the first sensor and/or the second sensor is configured to provide the first and/or second input data depending on the handling of the hair removal apparatus 10 and independent from an additional dedicated user input.

According to a sixth embodiment with reference to one of the preceding embodiments, the first sensor may comprise at least one of a pressure sensor and an accelerometer, wherein the pressure sensor may be configured to determine the current handling of the hair removal apparatus by sensing a pressure that is exerted by the hair removal apparatus onto a user's skin during the hair removal operation, and wherein the accelerometer may be configured to determine the current handling of the hair removal apparatus by sensing at least one of the frequency and the length of a hair removing stroke during the hair removal operation.

According to a seventh embodiment with reference to one of the preceding embodiments, the adaptation unit may be configured to perform a temporal averaging of a signal derived from the second input data for obtaining an average, and to adapt the control function of the control unit depending on said average and a current sample of the second input data.

According to an eight embodiment with reference to the seventh embodiment, the adaptation unit may be configured to perform the temporal averaging over one time interval that is as long as the duration of the hair removal operation, or to perform the temporal averaging over one time interval that is as long as an average hair removal operation, or to perform the temporal averaging over at least two time intervals, each being as long as an average stroke during a hair removal operation.

According to a ninth embodiment with reference to one of the seventh or the eighth embodiments, the adaptation unit may be configured to store the average upon an end of the hair removal operation, and to use the stored average at a beginning of a subsequent hair removal operation for adapting the control function of the control unit.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”

What is claimed is:

1. A hair removal apparatus for removing, in a hair removal operation, hair from a body portion, the hair removal apparatus comprising:

a shaver comprising a shaver head and a shaver handle, a first sensor located in the shaver handle that is configured to determine a current handling of the hair removal apparatus during the hair removal operation, an actuator for changing a hair removal characteristic of said hair removal apparatus, and an electronic unit comprising:

a control unit for controlling the actuator, wherein the control unit is configured to receive first multiple input data from the first sensor and to map, by using a control function, said first multiple input data to an output signal for controlling the actuator during the hair removal operation and an adaptation unit that is configured to receive second multiple input data from the first sensor and from a second sensor, and to adapt during the hair removal operation the control function of the control unit depending on the second multiple input data, wherein the second sensor is located in the shaver handle.

2. The hair removal apparatus of claim 1, wherein the adaptation unit is configured to determine a personal shaving behavior or a common shaving behavior based on the second multiple input data, and to adapt during the hair removal operation the control function of the control unit depending on the personal shaving behavior or the common shaving behavior, such that the control unit controls the actuator in response to the personal shaving behavior or the common shaving behavior.

3. The hair removal apparatus of claim 1, wherein the shaver head being pivotally attached to said shaver handle by a pivoting element mounted to said shaver handle, wherein the pivoting element defines a pivoting axis, wherein the shaver head is configured to move relative to the shaver handle by swiveling around the pivoting axis, wherein the actuator is configured to alter a swiveling stiffness at which the shaver head moves relative to the shaver handle by swiveling around the pivoting axis.

4. The hair removal apparatus of claim 1, wherein the adaptation unit is configured to perform a temporal statistical evaluation of a signal derived from the second multiple input data for obtaining one or more statistical measures, and to adapt the control function of the control unit depending on said one or more statistical measures.

5. The hair removal apparatus of claim 4, wherein the adaptation unit is configured to perform the temporal statistical evaluation over one time interval.

6. The hair removal apparatus of claim 1, wherein the adaptation unit is configured to adapt the control function of the control unit multiple times during the hair removal operation depending on the second multiple input data received at multiple points in time.

7. The hair removal apparatus of claim 1, wherein the first sensor comprises an acceleration sensor that is configured to determine the current handling of the hair removal apparatus by sensing an acceleration of the hair removal apparatus during the hair removal operation, and to provide acceleration sensor data as the first multiple input data to the control unit and to provide the acceleration sensor data as a portion of the second multiple input data to the adaptation unit.

8. The hair removal apparatus of claim 1, wherein the second sensor comprises a gyroscope that is configured to determine the current handling of the hair removal apparatus by sensing a rotation of the hair removal apparatus during the hair removal operation, and to provide gyroscope sensor data as a portion of the second multiple input data to the adaptation unit, and wherein the first sensor comprises a pressure sensor that is configured to determine the current handling of the hair removal apparatus by sensing a pressure exerted by the hair removal apparatus during the hair removal operation, and to provide pressure sensor data as a further portion of the second multiple input data to the adaptation unit and to provide the pressure sensor data as the first multiple input data to the control unit.

9. The hair removal apparatus of claim 1, wherein the control unit comprises a set of preconfigured control functions, and wherein the adaptation unit is configured to adapt during the hair removal operation the control function of the control unit by selecting, during the hair removal operation, one of the preconfigured control functions based on the second multiple input data.

10. The hair removal apparatus of claim 9, wherein the adaptation unit is configured to alter a parametrization of at least one preconfigured control function contained in the set of preconfigured control functions based on the second multiple input data.

11. The hair removal apparatus of claim 9, wherein the control unit is configured to perform a classification for classifying the first multiple input data, wherein the classification is performed by a neural network, a machine learning classifier or thresholding, wherein when the classification is performed by thresholding, the thresholding uses a threshold value, such that the first multiple input data is classified into one of at least two classes if a value of the first multiple input data is below or above the threshold value.

12. The hair removal apparatus of claim 11, wherein the adaptation unit is configured to adapt, based on the second multiple input data, the classification of the first multiple input data performed by the control unit, wherein when the classification is performed by thresholding, the adaptation unit is configured to (i) calculate an average value of the second multiple input data obtained during the hair removal operation and (ii) replace the threshold value of the control unit by the average value.

13. The hair removal apparatus of claim 1, wherein the shaver comprises reciprocally moving cutting blades.

14. A shaver comprising:

a shaver body and a shaver head being pivotally attached to said shaver body by a pivoting element mounted to said shaver body, wherein the pivoting element defines a pivoting axis, wherein the shaver head is configured to move relative to the shaver body by swiveling around the pivoting axis and an actuator for altering a swiveling stiffness at which the shaver head moves relative to the shaver body by swiveling around the pivoting axis, a pressure sensor located in the shaver body that is configured for sensing a current pressure exerted by the shaver on a skin of a user during a shaving operation, and an electronic unit comprising:

a control unit for controlling the actuator, wherein the control unit is configured to receive pressure sensor data from the pressure sensor and to map, by using a control function, said pressure sensor data to an output signal for controlling the actuator during the shaving operation and an adaptation unit that is configured to receive the pressure sensor data from the pressure sensor and further sensor data from a second sensor, and to adapt during the shaving operation the control function of the control unit depending on the pressure sensor data and the further sensor data, wherein the second sensor is located in the shaver body.

15. A method for controlling a hair removal apparatus for removing hair from a body portion in a hair removal operation, the hair removal apparatus comprising a shaver comprising a shaver head, a shaver handle, a first sensor located in the shaver handle and a second sensor located in the shaver handle, the method comprises:

receiving first multiple input data from the first sensor based on a sensing of a current handling of the hair removal apparatus during the hair removal operation, controlling an actuator for changing a hair removal characteristic of the hair removal apparatus, wherein the step of controlling comprises receiving the first multiple input data and to map, by using a control function, the first multiple input data to an output signal for controlling the actuator during the hair removal operation, and receiving second multiple input data from the first sensor and from the second sensor, and adapting during the hair removal operation the control function to the current handling of the hair removal apparatus depending on the second multiple input data.

16. A computer readable digital storage medium having stored thereon a computer program having a program code, the program code for performing, when running on a computer, the method according to claim 15.

17. The method of claim 15, wherein the shaver head being pivotally attached to said shaver handle by a pivoting element mounted to said shaver handle, wherein the pivoting element defines a pivoting axis, wherein the shaver head is configured to move relative to the shaver handle by swiveling around the pivoting axis, wherein the actuator is configured to alter a swiveling stiffness at which the shaver head moves relative to the shaver handle by swiveling around the pivoting axis.

* * * * *